US012772318B2

(12) United States Patent
Yuan et al.

(10) Patent No.: US 12,772,318 B2
(45) Date of Patent: Oct. 20, 2026

(54) BEAM FAILURE RECOVERY FOR MULTIPLE TRANSMIT RECEIVE POINTS

(71) Applicant: QUALCOMM Incorporated, San Diego, CA (US)

(72) Inventors: Fang Yuan, Beijing (CN); Yan Zhou, San Diego, CA (US); Wooseok Nam, San Diego, CA (US); Mostafa Khoshnevisan, San Diego, CA (US); Jelena Damnjanovic, Del Mar, CA (US); Tao Luo, San Diego, CA (US); Xiaoxia Zhang, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 383 days.

(21) Appl. No.: 18/553,063

(22) PCT Filed: Jun. 24, 2021

(86) PCT No.: PCT/CN2021/102034
§ 371 (c)(1),
(2) Date: Sep. 28, 2023

(87) PCT Pub. No.: WO2022/266922
PCT Pub. Date: Dec. 29, 2022

(65) Prior Publication Data

US 2024/0196463 A1 Jun. 13, 2024

(51) Int. Cl.
*H04W 76/19* (2018.01)
*H04B 7/024* (2017.01)
(Continued)

(52) U.S. Cl.
CPC ............ *H04W 76/19* (2018.02); *H04B 7/024* (2013.01); *H04B 7/06964* (2023.05); *H04L 5/0053* (2013.01); *H04W 72/21* (2023.01)

(58) Field of Classification Search
CPC .. H04W 76/19; H04W 72/21; H04B 7/06964; H04B 7/024; H04L 5/0053
See application file for complete search history.

(56) References Cited

U.S. PATENT DOCUMENTS

2010/0285809 A1* 11/2010 Lindstrom ........ H04W 36/0016 455/450
2020/0205150 A1* 6/2020 Cheng .................. H04W 72/21
(Continued)

FOREIGN PATENT DOCUMENTS

WO WO-2021027185 A1 * 2/2021 ............ H04W 72/21
WO WO-2021029738 A1 * 2/2021 ............ H04W 72/21

OTHER PUBLICATIONS

Supplementary European Search Report—EP21946418—Search Authority—Munich—Apr. 28, 2025.
(Continued)

*Primary Examiner* — Mewale A Ambaye
(74) *Attorney, Agent, or Firm* — Harrity & Harrity, LLP

(57) ABSTRACT

Various aspects of the present disclosure generally relate to wireless communication. In some aspects, a user equipment (UE) may detect failure of a beam, where the beam is one of a first beam associated with a first transmit receive point (TRP) or a second beam associated with a second TRP. The UE may transmit a recovery request that indicates a new beam for a beam reset by the UE, where the new beam is associated with a first group of physical uplink control channel (PUCCH) resources for the first TRP if the beam is the first beam, or associated with a second group of PUCCH resources for the second TRP if the beam is the second beam. The UE may reset the UE to the new beam after receiving a response to the recovery request. Numerous other aspects are described.

29 Claims, 14 Drawing Sheets

(51) Int. Cl.

| | |
|---|---|
| ***H04B 7/06*** | (2006.01) |
| ***H04L 5/00*** | (2006.01) |
| ***H04W 72/21*** | (2023.01) |

(56) References Cited

U.S. PATENT DOCUMENTS

| | | | | |
|---|---|---|---|---|
| 2020/0221448 | A1* | 7/2020 | Park | H04W 80/08 |
| 2020/0274606 | A1 | 8/2020 | Kang et al. | |
| 2021/0044342 | A1 | 2/2021 | He | |
| 2021/0105765 | A1* | 4/2021 | Cirik | H04B 7/024 |
| 2021/0153040 | A1* | 5/2021 | Zhou | H04W 76/15 |
| 2022/0295589 | A1* | 9/2022 | Tsai | H04B 17/318 |
| 2023/0138282 | A1 | 5/2023 | Guo | |
| 2024/0049330 | A1* | 2/2024 | Cirik | H04W 52/06 |
| 2024/0196393 | A1* | 6/2024 | Zhang | H04L 5/0053 |
| 2024/0275558 | A1* | 8/2024 | Chen | H04L 1/1854 |

OTHER PUBLICATIONS

International Search Report and Written Opinion—PCT/CN2021/102034—ISA/EPO—Feb. 25, 2022.

Nokia., et al., "Enhancements on Beam Management for Multi-TRP/Panel Transmission", R1-2008906, 3GPP TSG RAN WG1 #103-e Meeting, e-Meeting, Oct. 26-Nov. 13, 2020, Nov. 13, 2020, 12 Pages.

Supplementary Partial European Search Report—EP21946418—Search Authority—Munich—Feb. 7, 2025.

ZTE: "Enhancements on Beam Management for Multi-TRP", 3GPP TSG RAN WG1 Meeting #104-e, R1-2100288, 3GPP Draft, 3rd Generation Partnership Project, Mobile Competence Centre, 650, Route Des Lucioles, F-06921, Sophia-Antipolis Cedex, France, vol. RAN WG1, No. e-Meeting, Jan. 25-Feb. 5, 2021, Jan. 19, 2021, 18 Pages, XP051970903, Proposal 6, p. 15.

* cited by examiner

BEAM FAILURE RECOVERY FOR MULTIPLE TRANSMIT RECEIVE POINTS

CROSS-REFERENCE TO RELATED APPLICATION

This Patent Application is a 371 national stage of PCT Application No. PCT/CN2021/102034 filed on Jun. 24, 2021, entitled "BEAM FAILURE RECOVERY FOR MULTIPLE TRANSMIT RECEIVE POINTS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for beam failure recovery for multiple transmit receive points.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include detecting failure of a beam, where the beam is one of a first beam associated with a first transmit receive point (TRP) or a second beam associated with a second TRP. The method may include transmitting a recovery request that indicates a new beam for a beam reset by the UE, where the new beam is associated with a first group of physical uplink control channel (PUCCH) resources for the first TRP if the beam is the first beam, or associated with a second group of PUCCH resources for the second TRP if the beam is the second beam. The method may include resetting the UE to the new beam after receiving a response to the recovery request.

Some aspects described herein relate to a method of wireless communication performed by a base station. The method may include receiving, from a UE, a recovery request that indicates a failure of a beam, where the beam is one of a first beam associated with a first TRP or a second beam associated with a second TRP, and where the recovery request indicates a new beam associated with a first group of PUCCH resources for the first TRP if the beam is the first beam, or associated with a second group of PUCCH resources for the second TRP if the beam is the second beam. The method may include transmitting a response to the recovery request. The method may include receiving a communication using the new beam.

Some aspects described herein relate to a method of wireless communication performed by a UE. The method may include detecting failure of a first beam for a first TRP and failure of a second beam for a second TRP. The method may include transmitting a recovery request that indicates a first new beam associated with the first TRP and a second new beam associated with the second TRP. The method may include resetting, after receiving a response to the recovery request, the UE to beam sweep with the first new beam and the second new beam.

Some aspects described herein relate to a method of wireless communication performed by a base station. The method may include receiving, from a UE, a recovery request that indicates a first new beam associated with a first TRP and a second new beam associated with a second TRP. The method may include transmitting a response to the recovery request. The method may include configuring the first TRP and the second TRP to receive communications using the first new beam and the second new beam in a beam sweep.

Some aspects described herein relate to a UE for wireless communication. The user equipment may include a memory and one or more processors coupled to the memory. The one or more processors may be configured to detect failure of a beam, where the beam is one of a first beam associated with a first TRP or a second beam associated with a second TRP. The one or more processors may be configured to transmit a recovery request that indicates a new beam for a beam reset by the UE, where the new beam is associated with a first group of PUCCH resources for the first TRP if the beam is the first beam, or associated with a second group of PUCCH resources for the second TRP if the beam is the second beam. The one or more processors may be configured to reset the UE to the new beam after receiving a response to the recovery request.

Some aspects described herein relate to a base station for wireless communication. The base station may include a memory and one or more processors coupled to the memory. The one or more processors may be configured to receive, from a UE, a recovery request that indicates a failure of a beam, where the beam is one of a first beam associated with a first TRP or a second beam associated with a second TRP, and where the recovery request indicates a new beam associated with a first group of PUCCH resources for the first TRP if the beam is the first beam, or associated with a second group of PUCCH resources for the second TRP if the beam is the second beam. The one or more processors may be configured to transmit a response to the recovery request. The one or more processors may be configured to receive a communication using the new beam.

Some aspects described herein relate to a UE for wireless communication. The user equipment may include a memory and one or more processors coupled to the memory. The one or more processors may be configured to detect failure of a first beam for a first TRP and failure of a second beam for a second TRP. The one or more processors may be configured to transmit a recovery request that indicates a first new beam associated with the first TRP and a second new beam associated with the second TRP. The one or more processors may be configured to reset, after receiving a response to the recovery request, the UE to beam sweep with the first new beam and the second new beam.

Some aspects described herein relate to a base station for wireless communication. The base station may include a memory and one or more processors coupled to the memory. The one or more processors may be configured to receive, from a UE, a recovery request that indicates a first new beam associated with a first TRP and a second new beam associated with a second TRP. The one or more processors may be configured to transmit a response to the recovery request. The one or more processors may be configured to configure the first TRP and the second TRP to receive communications using the first new beam and the second new beam in a beam sweep.

Some aspects described herein relate to a non-transitory computer-readable medium that stores a set of instructions for wireless communication by a UE. The set of instructions, when executed by one or more processors of the UE, may cause the UE to detect failure of a beam, where the beam is one of a first beam associated with a first TRP or a second beam associated with a second TRP. The set of instructions, when executed by one or more processors of the UE, may cause the UE to transmit a recovery request that indicates a new beam for a beam reset by the UE, where the new beam is associated with a first group of PUCCH resources for the first TRP if the beam is the first beam, or associated with a second group of PUCCH resources for the second TRP if the beam is the second beam. The set of instructions, when executed by one or more processors of the UE, may cause the UE to reset the UE to the new beam after receiving a response to the recovery request.

Some aspects described herein relate to a non-transitory computer-readable medium that stores a set of instructions for wireless communication by a base station. The set of instructions, when executed by one or more processors of the base station, may cause the base station to receive, from a UE, a recovery request that indicates a failure of a beam, where the beam is one of a first beam associated with a first TRP or a second beam associated with a second TRP, and where the recovery request indicates a new beam associated with a first group of PUCCH resources for the first TRP if the beam is the first beam, or associated with a second group of PUCCH resources for the second TRP if the beam is the second beam. The set of instructions, when executed by one or more processors of the base station, may cause the base station to transmit a response to the recovery request. The set of instructions, when executed by one or more processors of the base station, may cause the base station to receive a communication using the new beam.

Some aspects described herein relate to a non-transitory computer-readable medium that stores a set of instructions for wireless communication by a one or more instructions that, when executed by one or more processors of a UE. The set of instructions, when executed by one or more processors of the one or more instructions that, when executed by one or more processors of a UE, may cause the one or more instructions that, when executed by one or more processors of a UE to detect failure of a first beam for a first TRP and failure of a second beam for a second TRP. The set of instructions, when executed by one or more processors of the one or more instructions that, when executed by one or more processors of a UE, may cause the one or more instructions that, when executed by one or more processors of a UE to transmit a recovery request that indicates a first new beam associated with the first TRP and a second new beam associated with the second TRP. The set of instructions, when executed by one or more processors of the one or more instructions that, when executed by one or more processors of a UE, may cause the one or more instructions that, when executed by one or more processors of a UE to reset, after receiving a response to the recovery request, the UE to beam sweep with the first new beam and the second new beam.

Some aspects described herein relate to a non-transitory computer-readable medium that stores a set of instructions for wireless communication by a base station. The set of instructions, when executed by one or more processors of the base station, may cause the base station to receive, from a UE, a recovery request that indicates a first new beam associated with a first TRP and a second new beam associated with a second TRP. The set of instructions, when executed by one or more processors of the base station, may cause the base station to transmit a response to the recovery request. The set of instructions, when executed by one or more processors of the base station, may cause the base station to configure the first TRP and the second TRP to receive communications using the first new beam and the second new beam in a beam sweep.

Some aspects described herein relate to an apparatus for wireless communication. The apparatus may include means for detecting failure of a beam, where the beam is one of a first beam associated with a first TRP or a second beam associated with a second TRP. The apparatus may include means for transmitting a recovery request that indicates a new beam for a beam reset by the apparatus, where the new beam is associated with a first group of PUCCH resources for the first TRP if the beam is the first beam, or associated with a second group of PUCCH resources for the second TRP if the beam is the second beam. The apparatus may include means for resetting the apparatus to the new beam after receiving a response to the recovery request.

Some aspects described herein relate to an apparatus for wireless communication. The apparatus may include means for receiving, from a UE, a recovery request that indicates a failure of a beam, where the beam is one of a first beam associated with a first TRP or a second beam associated with a second TRP, and where the recovery request indicates a new beam associated with a first group of PUCCH resources for the first TRP if the beam is the first beam, or associated with a second group of PUCCH resources for the second TRP if the beam is the second beam. The apparatus may include means for transmitting a response to the recovery request. The apparatus may include means for receiving a communication using the new beam.

Some aspects described herein relate to an apparatus for wireless communication. The apparatus may include means for detecting failure of a first beam for a first TRP and failure of a second beam for a second TRP. The apparatus may include means for transmitting a recovery request that indicates a first new beam associated with the first TRP and a second new beam associated with the second TRP. The apparatus may include means for resetting, after receiving a response to the recovery request, the apparatus to beam sweep with the first new beam and the second new beam.

Some aspects described herein relate to an apparatus for wireless communication. The apparatus may include means for receiving, from a UE, a recovery request that indicates a first new beam associated with a first TRP and a second new beam associated with a second TRP. The apparatus may include means for transmitting a response to the recovery request. The apparatus may include means for configuring the first TRP and the second TRP to receive communications using the first new beam and the second new beam in a beam sweep.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented, or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
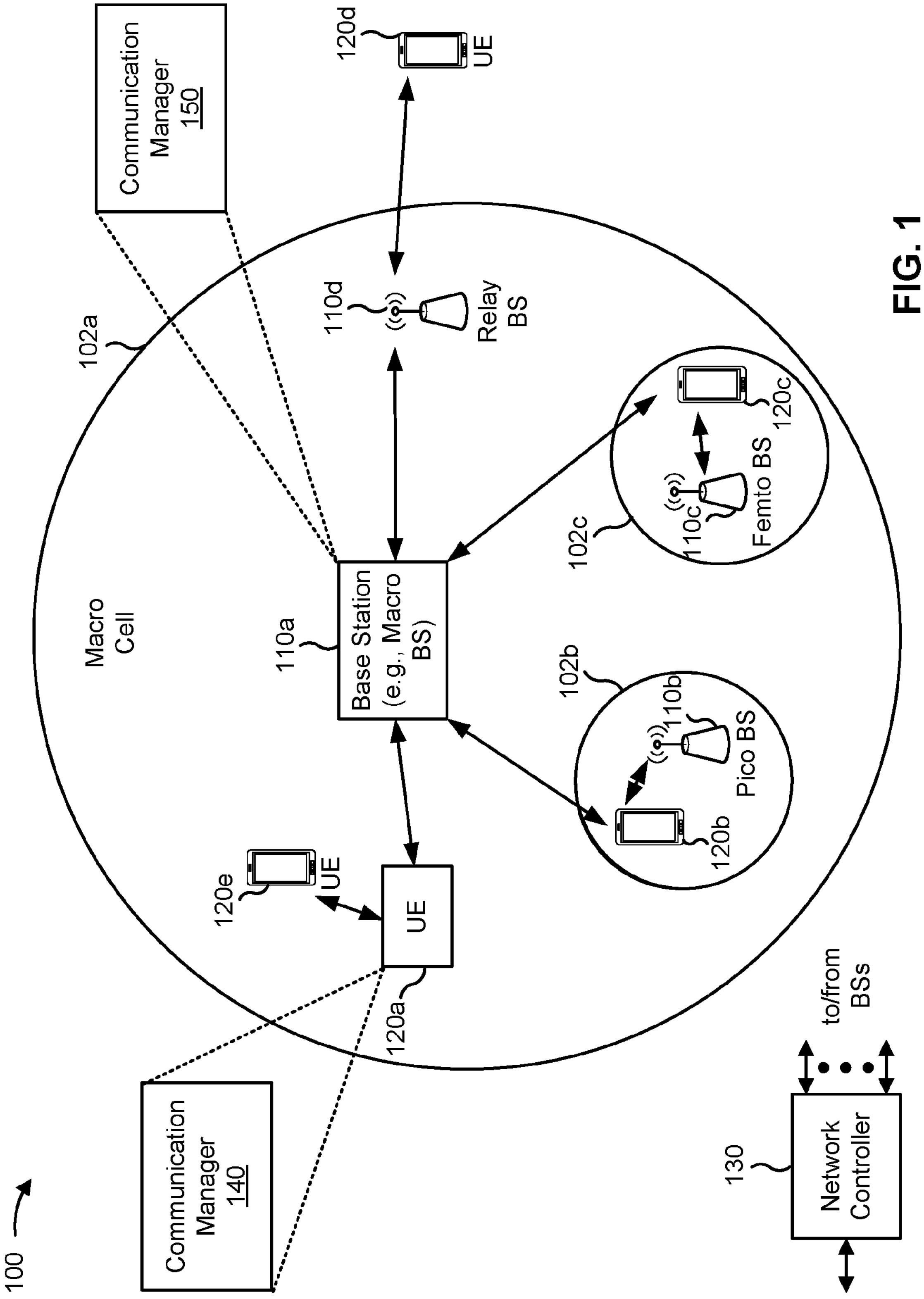
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may detect failure of a beam, where the beam is one of a first beam associated with a first TRP or a second beam associated with a second TRP. The communication manager 140 may transmit a recovery request that indicates a new beam for a beam reset by the UE, where the new beam is associated with a first group of physical uplink control channel (PUCCH) resources for the first TRP if the beam is the first beam, or associated with a second group of PUCCH resources for the second TRP if the beam is the second beam. The communication manager 140 may reset the UE to the new beam after receiving a response to the recovery request. Additionally, or alternatively, the communication manager 140 may perform one or more other operations described herein.

In some aspects, the base station 110 may include a communication manager 150. As described in more detail elsewhere herein, the communication manager 150 may receive, from a UE, a recovery request that indicates a failure of a beam, where the beam is one of a first beam associated with a first TRP or a second beam associated with a second TRP, and where the recovery request indicates a new beam associated with a first group of PUCCH resources for the first TRP if the beam is the first beam, or associated with a second group of PUCCH resources for the second TRP if the beam is the second beam. The communication manager 150 may transmit a response to the recovery request and receive a communication using the new beam. Additionally, or alternatively, the communication manager 150 may perform one or more other operations described herein.

In some aspects, the UE 120 may include a communication manager 140. As described in more detail elsewhere herein, the communication manager 140 may detect failure of a first beam for a first TRP and failure of a second beam for a second TRP. The communication manager 140 may transmit a recovery request that indicates a first new beam associated with the first TRP and a second new beam associated with the second TRP and reset, after receiving a response to the recovery request, the UE to beam sweep with the first new beam and the second new beam. Additionally, or alternatively, the communication manager 140 may perform one or more other operations described herein.

In some aspects, the base station 110 may include a communication manager 150. As described in more detail elsewhere herein, the communication manager 150 may receive, from a UE, a recovery request that indicates a first new beam associated with a first TRP and a second new beam associated with a second TRP, transmit a response to the recovery request, and configure the first TRP and the second TRP to receive communications using the first new beam and the second new beam in a beam sweep. Additionally, or alternatively, the communication manager 150 may perform one or more other operations described herein.

As indicated above, FIG. 1 is provided as an example. Other examples may differ from what is described with regard to FIG. 1.

Figure 2:
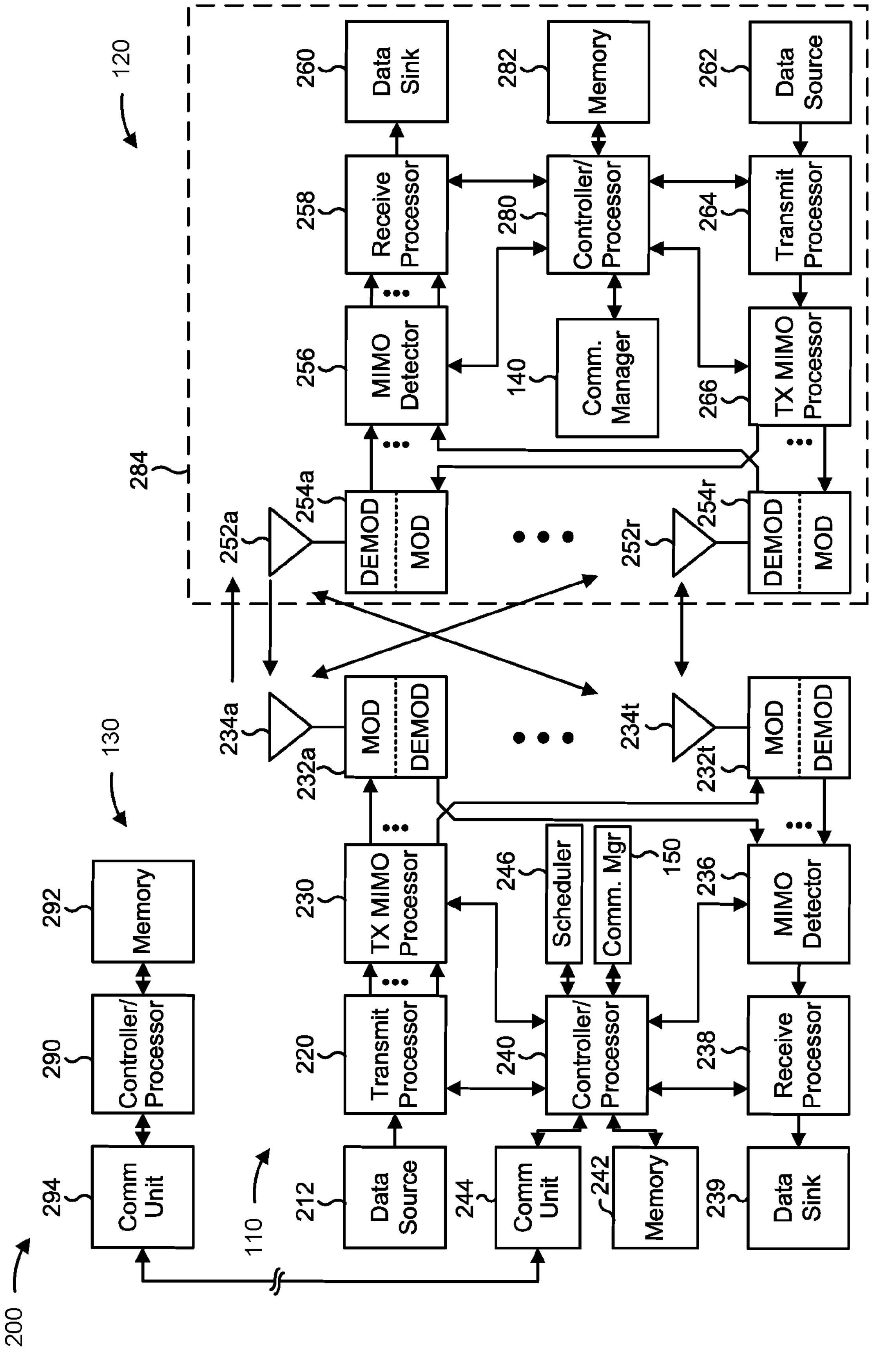
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 1-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 1-14).

The controller/processor 240 of the base station 110, the controller/processor 280 of the UE 120, and/or any other component(s) of FIG. 2 may perform one or more techniques associated with beam failure recovery (BFR) for multiple TRPs, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for detecting failure of a beam, where the beam is one of a first beam associated with a first TRP or a second beam associated with a second TRP, means for transmitting a recovery request that indicates a new beam for a beam reset by the UE, where the new beam is associated with a first group of PUCCH resources for the first TRP if the beam is the first beam, or associated with a second group of PUCCH resources for the second TRP if the beam is the second beam, and/or means for resetting the UE to the new beam after receiving a response to the recovery request. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for receiving, from a UE, a recovery request that indicates a failure of a beam, where the beam is one of a first beam associated with a first TRP or a second beam associated with a second TRP, and where the recovery request indicates a new beam associated with a first group of PUCCH resources for the first TRP if the beam is the first beam, or associated with a second group of PUCCH resources for the second TRP if the beam is the second beam, means for transmitting a response to the recovery request, and/or means for receiving a communication using the new beam. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE 120 includes means for detecting failure of a first beam for a first TRP and failure of a second beam for a second TRP, means for transmitting a recovery request that indicates a first new beam associated with the first TRP and a second new beam associated with the second TRP, and/or means for resetting, after receiving a response to the recovery request, the UE to beam sweep with the first new beam and the second new beam. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for receiving, from UE 120, a recovery request that indicates a first new beam associated with a first TRP and a second new beam associated with a second TRP, means for transmitting a response to the recovery request, and/or means for configuring the first TRP and the second TRP to receive communications using the first new beam and the second new beam in a beam sweep. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
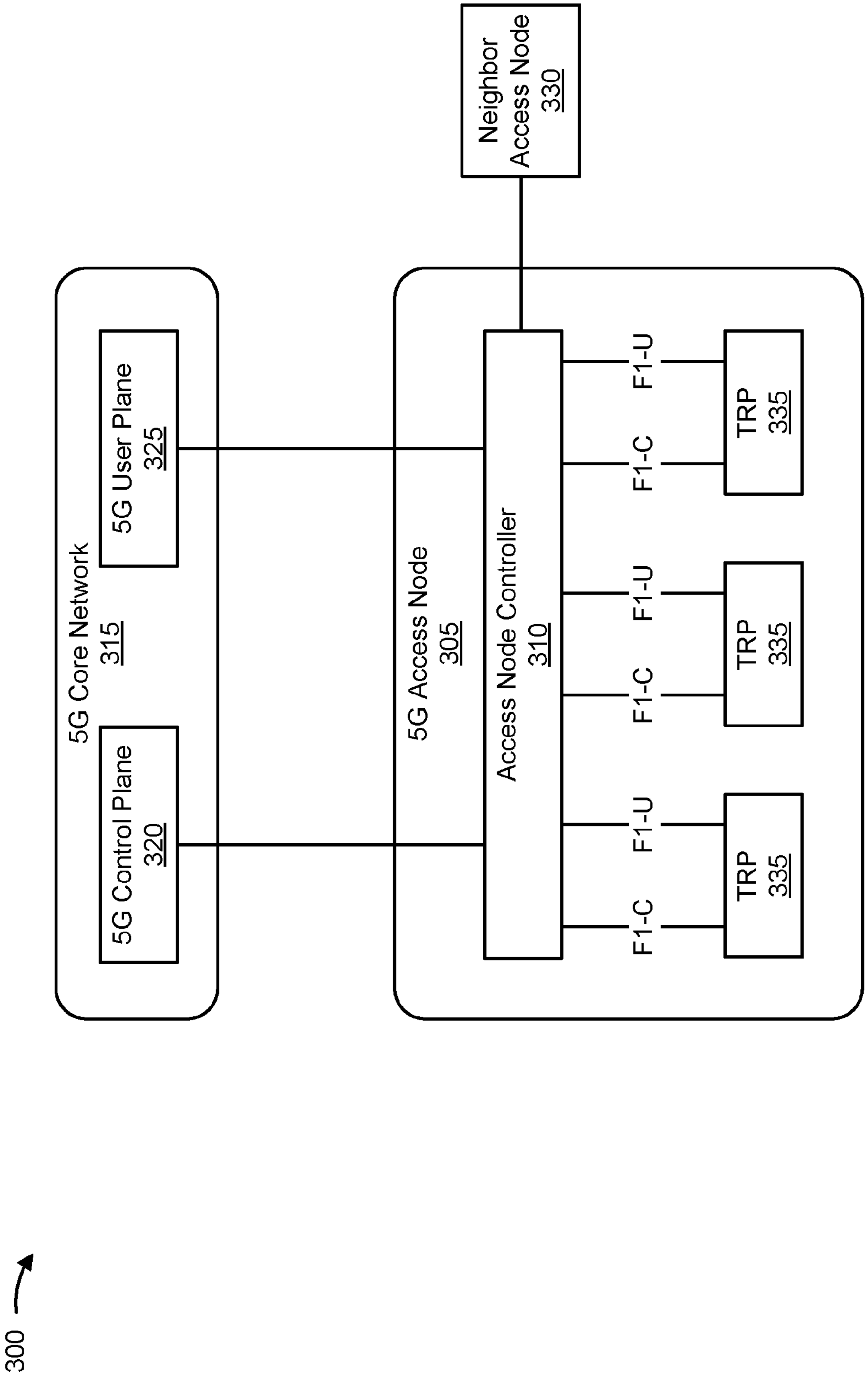
FIG. 3 illustrates an example logical architecture of a distributed radio access network, in accordance with the present disclosure.

FIG. 3 illustrates an example logical architecture of a distributed radio access network (RAN) 300, in accordance with the present disclosure.

A 5G access node 305 may include an access node controller 310. The access node controller 310 may be a central unit (CU) of the distributed RAN 300. In some aspects, a backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330 (e.g., another 5G access node 305 and/or an LTE access node) may terminate at the access node controller 310.

The access node controller 310 may include and/or may communicate with one or more TRPs 335 (e.g., via an F1 Control (F1-C) interface and/or an F1 User (F1-U) interface). A TRP 335 may be a distributed unit (DU) of the distributed RAN 300. In some aspects, a TRP 335 may correspond to a base station 110 described above in connection with FIG. 1. For example, different TRPs 335 may be included in different base stations 110. Additionally, or alternatively, multiple TRPs 335 may be included in a single base station 110. In some aspects, a base station 110 may include a CU (e.g., access node controller 310) and/or one or more DUs (e.g., one or more TRPs 335). In some cases, a TRP 335 may be referred to as a cell, a panel, an antenna array, or an array.

A TRP 335 may be connected to a single access node controller 310 or to multiple access node controllers 310. In some aspects, a dynamic configuration of split logical functions may be present within the architecture of distributed RAN 300. For example, a packet data convergence protocol (PDCP) layer, a radio link control (RLC) layer, and/or a medium access control (MAC) layer may be configured to terminate at the access node controller 310 or at a TRP 335.

In some aspects, multiple TRPs 335 may transmit communications (e.g., the same communication or different communications) in the same transmission time interval (TTI) (e.g., a slot, a mini-slot, a subframe, or a symbol) or different TTIs using different quasi-co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 335 may be configured to individually (e.g., using dynamic selection) or jointly (e.g., using joint transmission with one or more other TRPs 335) serve traffic to a UE 120. In some aspects, each TRP may be associated with a beam for transmitting communications on a PUCCH.

As indicated above, FIG. 3 is provided as an example. Other examples may differ from what was described with regard to FIG. 3.

Figure 4:
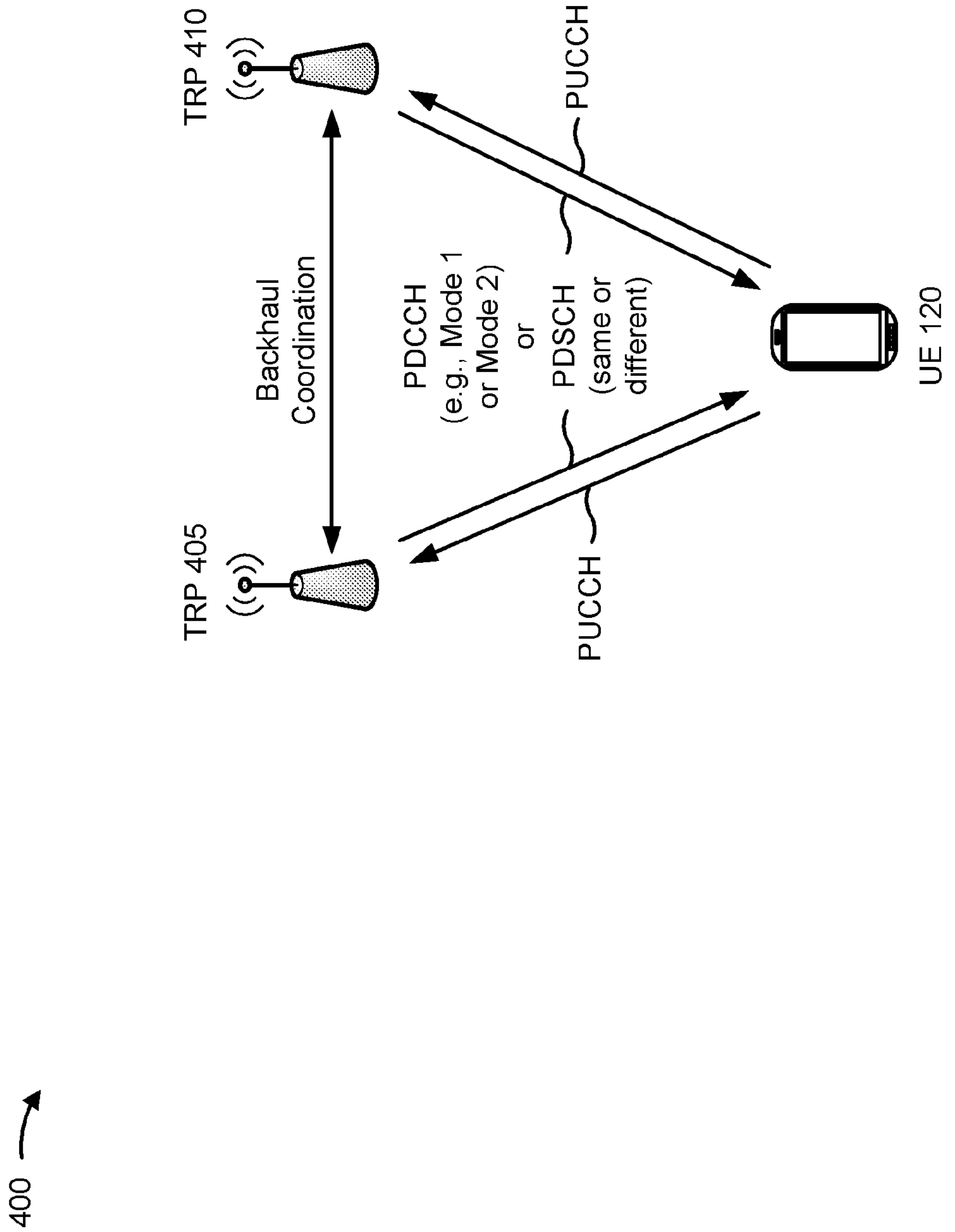
FIG. 4 is a diagram illustrating an example of multiple transmit receive point (TRP) communication, in accordance with the present disclosure.

FIG. 4 is a diagram illustrating an example 400 of multi-TRP communication (sometimes referred to as multi-panel communication), in accordance with the present disclosure. As shown in FIG. 4, TRP 405 and TRP 410 may communicate with the same UE 120. TRP 405 and TRP 410 may correspond to a TRP 335 described above in connection with FIG. 3.

TRP 405 and TRP 410 may communicate with the same UE 120 in a coordinated manner (e.g., using coordinated multipoint transmissions) to improve reliability and/or increase throughput. TRP 405 and TRP 410 may coordinate such communications via an interface between TRP 405 and TRP 410 (e.g., a backhaul interface and/or an access node controller 310). The interface may have a smaller delay and/or higher capacity when TRP 405 and TRP 410 are co-located at the same base station 110 (e.g., when TRP 405 and TRP 410 are different antenna arrays or panels of the same base station 110), and may have a larger delay and/or lower capacity (as compared to co-location) when TRP 405 and TRP 410 are located at different base stations 110. TRP 405 and TRP 410 may communicate with the UE 120 using different QCL relationships (e.g., different TCI states), different DMRS ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, TRP 405 and TRP 410 may transmit communications to the UE 120 on the same PDSCH. For example, a communication may be transmitted using a single codeword with different spatial layers for different TRPs (e.g., where one codeword maps to a first set of layers transmitted by TRP 405 and maps to a second set of layers transmitted by TRP 410). As another example, a communication may be transmitted using multiple codewords, where different codewords are transmitted by different TRPs (e.g., using different sets of layers). In either case, different TRPs may use different beams or QCL relationships (e.g., different TCI states) for different DMRS ports corresponding to different layers. For example, TRP 405 may use a first QCL relationship or a first TI state for a first set of DMRS ports corresponding to a first set of layers, and TRP 410 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0 or DCI format 1_1) may indicate the first QCL relationship (e.g., by indicating a first TI state) and the second QCL relationship (e.g., by indicating a second TCI state). The first and the second TCI states may be indicated using a TCI field in the DCI. In general, the TCI field can indicate a single TCI state (for single-TRP transmission) or multiple TI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by TRP 405, and a second PDCCH may schedule a second codeword to be transmitted by TRP 410. Furthermore, first DCI (e.g., transmitted by TRP 405) may schedule a first PDSCH communication associated with a first set of DMRS ports with a first QCL relationship (e.g., indicated by a first TCI state) for TRP 405, and second DCI (e.g., transmitted by TRP 410) may schedule a second PDSCH communication associated with a second set of DMRS ports with a second QCL relationship (e.g., indicated by a second TCI state) for TRP 410. In this case, DCI (e.g., having DCI format 1_0 or DCI format 1_1) may indicate a corresponding TCI state for a TRP corresponding to the DCI. The TCI field of a DCI indicates the corresponding TCI state (e.g., the TCI field of the first DCI indicates the first TCI state and the TCI field of the second DCI indicates the second TCI state).

In some aspects, the UE 120 may use a first beam to TRP 405 or a second beam to TRP 410 for PUCCH communications or physical uplink shared channel (PUSCH) communications. The PUCCH communications may include hybrid automatic repeat request (HARQ) feedback. The first beam may correspond to the first TCI state, and the second beam may correspond to the second TCI state.

The UE 120 may use beam failure detection (BFD) to determine if the first beam and/or the second beam has failed. BFD may involve monitoring and measuring channel state information reference signals (CSI-RSs) and/or synchronization signal blocks (SSBs) that use a particular beam. If the measurements satisfy a threshold (e.g., minimum RSRP, minimum RSRQ, minimum signal to interference ratio (SIR), maximum block error rate (BLER)), the UE 120 may determine that failure of the beam has been detected. The measurements may be considered within a time limit and/or based on a counter.

If there is a beam failure, such as for the first beam or the second beam, the UE 120 may perform BFR. BFR may involve a random access procedure or transmitting a beam failure recovery request to the base station 110. The recovery request may include an indication of a new beam (e.g., preferred candidate beam, available candidate beam) that may be used for a beam reset for a primary cell (PCell) or primary secondary cell (PSCell). In Release 15, the base station 110 may transmit a response to the recovery request, such as a PDCCH communication with a new cellular random network temporary identifier (C-RNTI) in a control resource set (CORESET) and search space set configured for beam failure recovery. The UE 120 may reset the beam (e.g., to the candidate beam) after 28 symbols from a last symbol of a first PDCCH reception in a search space set (provided by recoverySearchSpaceId) for which the UE detects DCI with a cyclic redundancy check (CRC) scrambled by a C-RNTI or an MCS-C-RNTI. The UE 120 may use the candidate beam until the UE 120 receives an activation command for PUCCH-SpatialRelationInfo or is provided PUCCH-SpatialRelationInfo for PUCCH resources. The UE 120 may transmit a PUCCH communication on a same cell as a physical random access channel (PRACH) transmission using a same spatial filter that was used for the last PRACH transmission.

In a BFR scenario for Release 16, the PDCCH communication, as the response to the recovery request, may be in a DCI format that schedules a PUSCH transmission with the same HARQ process identifier (ID) as for the transmission of the first PUSCH carrying beam failure information and having a toggled new data indicator (NDI) field value. The UE 120 may monitor for PDCCH communications in all CORESETs on a secondary cell (SCell) indicated by a medium access control control element (MAC CE) using the same antenna port QCL parameters as the QCL parameters associated with the corresponding index for a new beam. The UE 120 may transmit a PUCCH communication on a PUCCH-SCell using the same spatial filter as a spatial filter for a new beam for periodic CSI-RS or SSB block reception, if the UE 120 is provided PUCCH-SpatialRelationInfo for the PUCCH, a location report request (LRR) was not transmitted or was transmitted on the PCell or the PSCell, and the PUCCH-SCell is included in the SCells indicated by the MAC CE.

BFR for Release 15 or Release 16 involves one BFR in a cell. However, in a multi-TRP scenario, a PUCCH transmission may be scheduled by a DCI from either TRP, and there may be multiple BFRs in a PUCCH-SCell. If the first beam to TRP 405 fails but the second beam to TRP 410 does not fail, the UE 120 may not be aware of which beam failed and the UE 120 may reset both beams, including power control parameters for the beams. This may cause the UE 120 to waste processing resources and signaling resources resetting the second beam to TRP 410 that has not failed. The UE 120 may also not know which PUCCH resources to use for per-TRP BFR.

As indicated above, FIG. 4 is provided as an example. Other examples may differ from what is described with respect to FIG. 4.

Figure 5:
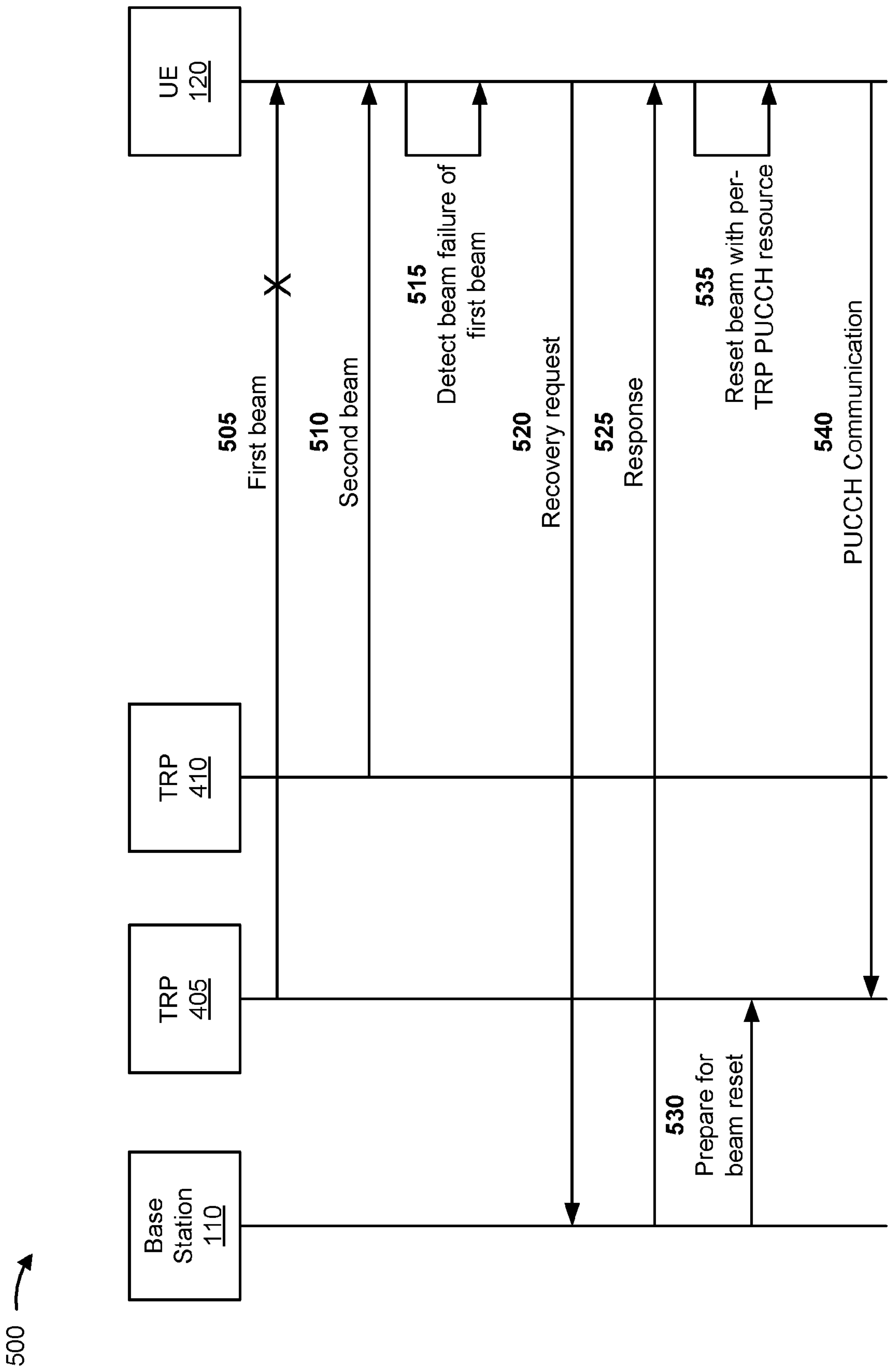
FIG. 5 is a diagram illustrating an example associated with beam failure recovery (BFR) for multiple TRPs, in accordance with the present disclosure.

FIG. 5 is a diagram illustrating an example 500 associated with BFR for multiple TRPs, in accordance with the present disclosure. As shown in FIG. 5, a base station 110 and a UE 120 may communicate with one another. The base station 110 may include and/or control TRP 405 and/or TRP 410. A TRP may be identified by an explicit TRP ID, a CORESET pool index, TCI state ID, or a sounding reference signal (SRS) resource set ID.

According to various aspects described herein, the UE 120 may be configured to reset a beam that failed, in a per-TRP scenario, in association with a PUCCH resource (e.g., time-frequency resource on the PUCCH) that is specific to each TRP. The beam that failed may be associated with one of multiple beams, such as a first beam 505 associated with TRP 405 or a second beam 510 associated with TRP 410. The UE 120 may reset the beam that failed with a new beam. The new beam may be associated with a first group of PUCCH resources (e.g., configured by pucch-ResourceGroupId1-r17) for TRP 405 if the beam that failed is the first beam 505. TRP 405 may be associated with a first CORESET pool index, a first set of BFD reference signals (e.g., configured by failureDetectionResourcesToAddModList1) and a first set of new beam identifier (NBI) reference signals (e.g., configured by candidateBeamRSList1). The new beam may be associated with a second group of PUCCH resources (e.g., configured by pucch-ResourceGroupId2-r17) for TRP 410 if the beam that failed is the second beam 510. TRP 410 may be associated with a second CORESET pool index, a second set of BFD reference signals (e.g., configured by failureDetectionResourcesToAddModList2), and a second set of NBI reference signals (e.g., configured by candidateBeamRSList2). In some aspects, there may be beams from more than two TRPs. In other words, the UE 120 may reset the beam with a PUCCH resource from a group of PUCCH resources that are associated with the TRP. By resetting a beam with a PUCCH resource specific to the corresponding TRP, the UE 120 may conserve processing resources and signaling resources.

The UE 120 may perform measurements of the first beam 505 and the second beam 510. The first beam 505 may have properties that satisfy one or more thresholds (e.g., RSRP, SIR, BLER). As shown by reference number 515, the UE 120 may detect that the first beam 505 is failing.

As shown by reference number 520, the UE 120 may transmit a beam failure recovery request to the base station 110. The recovery request may indicate a new beam that may be used by the UE 120 to reset the beam that failed. The new beam may be associated with a PUCCH resource of the first group of PUCCH resources. The new beam may be identified by a reference signal index configured in the set of NBI reference signals associated with the failed beam.

As shown by reference number 525, the base station 110 may transmit a response to the UE 120. The response may indicate that the new beam is to be used for resetting the beam. As shown by reference number 530, the base station 110 may prepare for the beam reset. For example, the base station 110 may activate a TCI that corresponds to the new beam.

As shown by reference number 535, the UE 120 may reset the beam to the new beam. The reset may occur a quantity of symbols (e.g., 28 symbols) after receiving the response to the recovery request of the beam failure. The UE 120 may configure the UE 120 with a spatial domain transmit filter that corresponds to the new beam. The spatial filter may be applied for a PUCCH resource in the first group of PUCCH resources. In some aspects, the UE 120 may be configured with the spatial filter until the UE 120 receives an activation command to change beams for the PUCCH resource in the first group of PUCCH resources. Alternatively, in some aspects, the UE 120 may be configured with the spatial filter until the UE 120 receives an activation command to change beams for the PUCCH resource in the first group of PUCCH resources, a PUCCH resource in the second group of PUCCH resources, or a PUCCH resource in another group of PUCCH resources.

A closed loop index value may be used for transmit power control. For example, the first group of PUCCH resources may have a closed loop index value of 0, and the second group of PUCCH resources may have a closed loop index value of 1. The UE 120 may not reset any closed loop index for a PUCCH resource, in contrast to a reset of the closed loop index that may take place for Release 15 or Release 16.

In some aspects, the UE 120 may reuse a group of PUCCH resources from an existing radio resource control (RRC) configuration. For example, a group of PUCCH resources may be indicated by pucch-ResourceGroupId-r16. Each per-TRP BFR may be associated with one or more pucch-ResourceGroupId-r16s, since the quantity of per-TRP BFR in a serving cell is 2 while the maximum quantity of PUCCH groups defined in R16 is 4 (e.g., maxNrofPUCCH-ResourcesPerGroup-r16=4). That is, a total quantity of the PUCCH groups for multiple TRPs may be 4. For example, in a first scenario, TRP 405 may have 2 PUCCH groups, and TRP 410 may have 2 PUCCH groups. In a second scenario, TRP 405 may have 1 PUCCH group, and TRP 410 may have 3 PUCCH groups. In a third scenario, TRP 405 may have 3 PUCCH groups, and TRP 410 may have 1 PUCCH group.

In some aspects, the UE 120 may use a group of PUCCH resources that is dedicated for BFR. A group of PUCCH resources may be configured for each per-TRP BFR configuration (e.g., BFR-PUCCH-ResourceGroup-r17).

As shown by reference number 540, the base station 110 may receive a communication using the new beam. The communication may be a PUCCH communication. In some aspects, the communication may be a PUSCH communication.

As indicated above, FIG. 5 is provided as an example. Other examples may differ from what is described with respect to FIG. 5.

Figure 6:
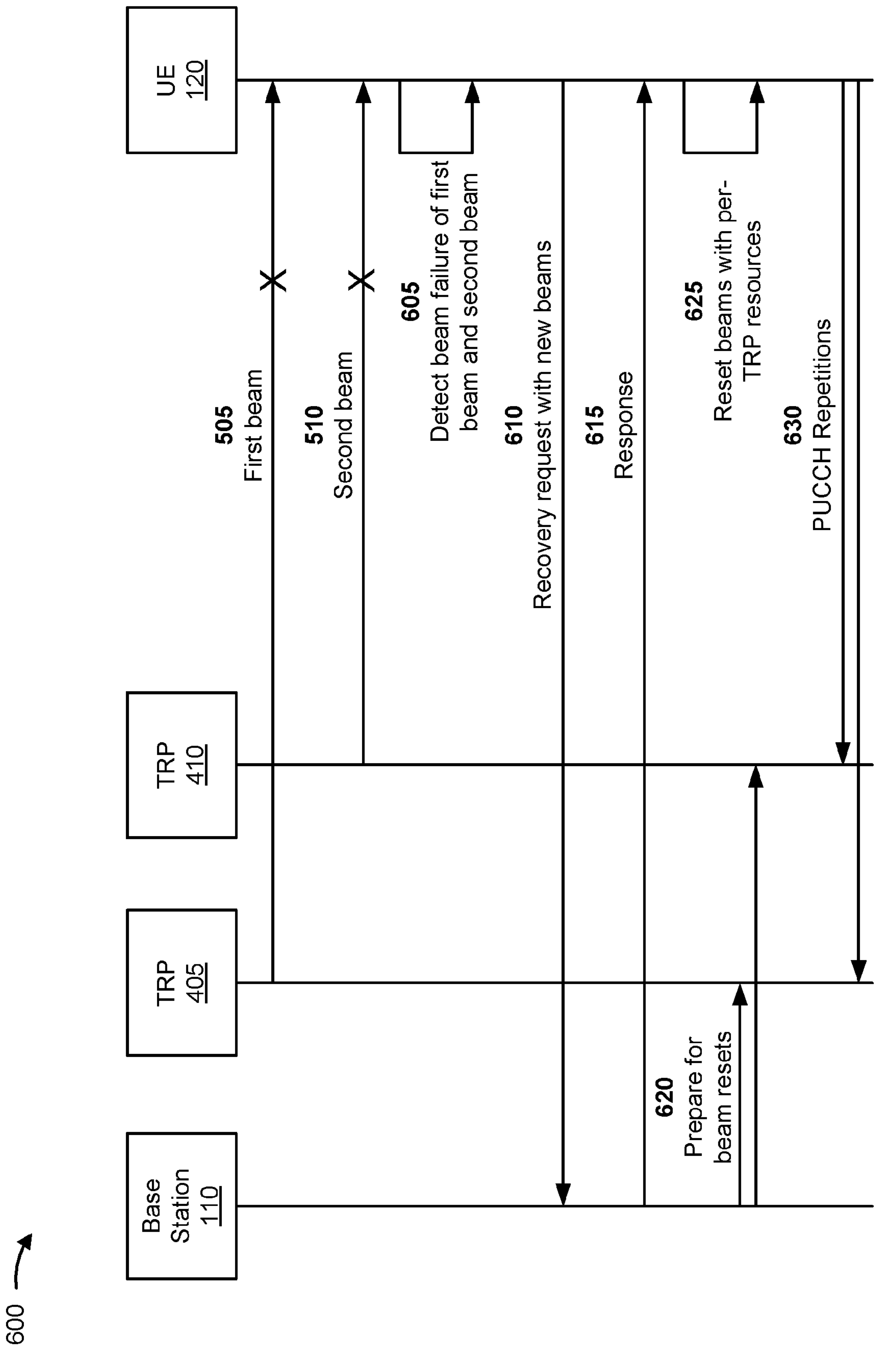
FIG. 6 is a diagram illustrating an example associated with BFR for multiple TRPs, in accordance with the present disclosure.

FIG. 6 is a diagram illustrating an example 600 associated with BFR for multiple TRPs, in accordance with the present disclosure. As shown in FIG. 6, a base station 110 and a UE 120 may communicate with one another. The base station 110 may include and/or control TRP 405 and/or TRP 410.

According to various aspects described herein, the UE 120 may be configured to reset two or more beams of a serving cell that failed. For example, the first beam 505 associated with TRP 405 and the second beam 510 associated with TRP 410 may have both failed. The UE 120 may report beam failures per TRP in a recovery request to the base station 110. The UE 120 may reset the beams that failed with new beams that are associated with resources specific to each TRP. The new beams may be indicated in the recovery request to the base station 110. By resetting the beams with per-TRP resources, the UE 120 may conserve processing resources and signaling resources.

The UE 120 may perform measurements of the first beam 505 and the second beam 510. The first beam 505 and the second beam 510 may have properties that satisfy one or more thresholds. As shown by reference number 605, the UE 120 may detect that the first beam 505 and the second beam 510 are failing.

As shown by reference number 610, the UE 120 may transmit a recovery request to the base station 110. The recovery request may indicate a new beam for each beam that failed. A first new beam may be associated with a PUCCH resource of a first group of PUCCH resources, and a second new beam may be associated with a PUCCH resource of a second group of PUCCH resources.

As shown by reference number 615, the base station 110 may transmit a response to the UE 120. The response may indicate that the new beams are to be used for the reset of the beams. As shown by reference number 620, the base station 110 may prepare for the beam resets. For example, the base station 110 may activate TCIs that correspond to the new beams.

As shown by reference number 625, the UE 120 may reset the beams to the new beams. For example, the UE 120 may configure the UE 120 with spatial filters that correspond to the new beams.

As shown by reference number 630, the base station 110 may receive communications using the new beams. The communications may be PUCCH communications. In some aspects, the PUCCH communications may be PUCCH repetitions, and the UE 120 may transmit the PUCCH repetitions using the first new beam and the second new beam in a time domain multiplexing (TDM) manner. For example, the UE 120 may transmit the PUCCH repetitions on the new beams using beam sweeping. The PUCCH repetitions may involve inter-slot TDM or intra-slot (e.g., mini-slots) TDM. The base station 110 may use RRC signaling to configure the UE 120 for a PUCCH repetition mode.

In some aspects, the UE 120 may use beam sweeping of two (or more) TRP-specific new beams in various scenarios where two (or more) corresponding TRPs have good connections. One scenario may include a single frequency network (SFN) with PDCCH transmissions, where a CORESET is configured with two TCI states. Another scenario may include multi-TRP transmissions, where two CORESET pool index values are configured, and a HARQ acknowledgement (ACK)/negative acknowledgement (NACK) codebook is configured in a joint feedback mode. Another scenario may include PDCCH repetition, where a PDCCH candidate is repeated in two CORESETs of different TCI states. In some aspects, the UE 120 may perform beam sweeping with TRP-specific new beams only when two (or more) per-TRP beam BFRs are reported in the same BFR-MAC CE (e.g., simultaneous per-TRP BFRs in two TRPs). By beam sweeping with the new beams that are specified per TRP BFR, beam coverage may improve, and the UE 120 and TRPs may conserve processing resources and signaling resources.

As indicated above, FIG. 6 is provided as an example. Other examples may differ from what is described with respect to FIG. 6.

Figure 7:
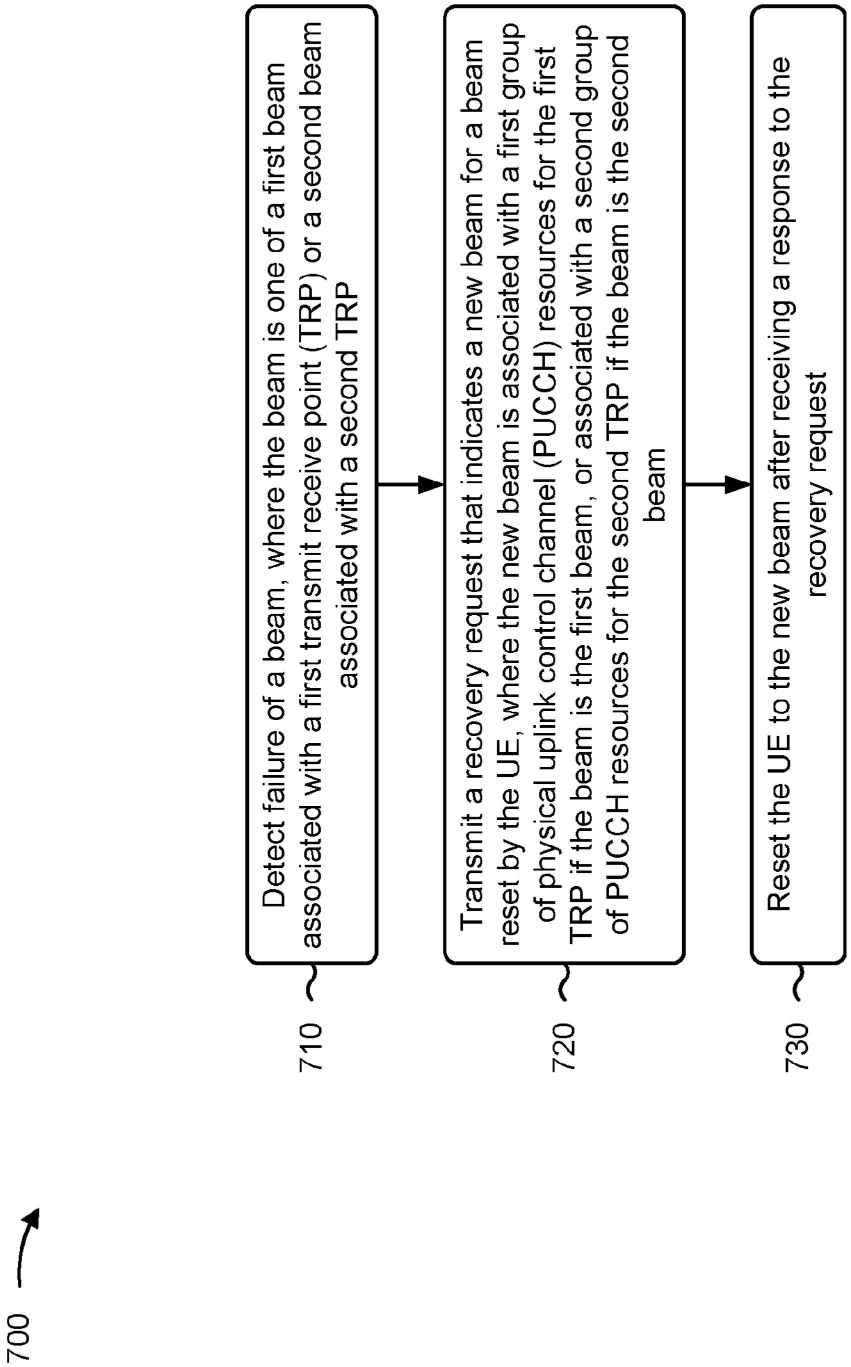
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with BFR for multiple TRPs.

As shown in FIG. 7, in some aspects, process 700 may include detecting failure of a beam (block 710). For example, the UE (e.g., using communication manager 140 and/or detection component 1108 depicted in FIG. 11) may detect failure of a beam, as described above. In some aspects, the beam may be one of a first beam associated with a first TRP or a second beam associated with a second TRP.

As further shown in FIG. 7, in some aspects, process 700 may include transmitting a recovery request that indicates a new beam for a beam reset by the UE (block 720). For example, the UE (e.g., using communication manager 140 and/or transmission component 1104 depicted in FIG. 11) may transmit a recovery request that indicates a new beam for a beam reset by the UE, as described above. In some aspects, the new beam may be associated with a first group of PUCCH resources for the first TRP if the beam is the first beam, or the new beam may be associated with a second group of PUCCH resources for the second TRP if the beam is the second beam.

As further shown in FIG. 7, in some aspects, process 700 may include resetting the UE to the new beam after receiving a response to the recovery request (block 730). For example, the UE (e.g., using communication manager 140 and/or reset component 1110 depicted in FIG. 11) may reset the UE to the new beam after receiving a response to the recovery request, as described above.

Process 700 may include additional aspects, such as any single aspect or any combination of aspects described below and/or in connection with one or more other processes described elsewhere herein.

In a first aspect, the first group of PUCCH resources are associated with a first CORESET pool index, a first set of BFD reference signals, and a first set of NBI reference signals, and the second group of PUCCH resources are associated with a second CORESET pool index, a second set of BFD reference signals, and a second set of NBI reference signals.

In a second aspect, alone or in combination with the first aspect, process 700 includes receiving a message indicating the first CORESET pool index, the first set of BFD reference signals, the first set of NBI reference signals, and the first group of PUCCH resources for the first TRP, the message also indicating the second CORESET pool index, the second set of BFD reference signals, the second set of NBI reference signals, and the second group of PUCCH resources for the second TRP.

In a third aspect, alone or in combination with one or more of the first and second aspects, resetting the UE to the new beam includes configuring the UE, a quantity of symbols after receiving the response, with a spatial filter that corresponds to the new beam.

In a fourth aspect, alone or in combination with one or more of the first through third aspects, the quantity of symbols is 28 symbols.

In a fifth aspect, alone or in combination with one or more of the first through fourth aspects, the UE is configured with the spatial filter until the UE receives an activation command to change beams for a PUCCH resource in the first group if the beam is the first beam, or receives an activation command to change beams for a PUCCH resource in the second group if the beam is the second beam.

In a sixth aspect, alone or in combination with one or more of the first through fifth aspects, the UE is configured with the spatial filter until the UE receives an activation command to change beams for a PUCCH resource in the first group or the second group.

In a seventh aspect, alone or in combination with one or more of the first through sixth aspects, the first group includes PUCCH resources with a first value of a closed loop index, and the second group includes PUCCH resources with a second value of a closed loop index.

In an eighth aspect, alone or in combination with one or more of the first through seventh aspects, the first group or the second group includes PUCCH resources of a stored RRC configuration.

In a ninth aspect, alone or in combination with one or more of the first through eighth aspects, the first TRP is associated with a first one or more PUCCH groups and the second TRP is associated with a second one or more PUCCH groups, where a total quantity of PUCCH groups of the first one or more PUCCH groups and the second one or more PUCCH groups is 4.

In a tenth aspect, alone or in combination with one or more of the first through ninth aspects, at least one of the first PUCCH group or the second PUCCH group is dedicated to BFR.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
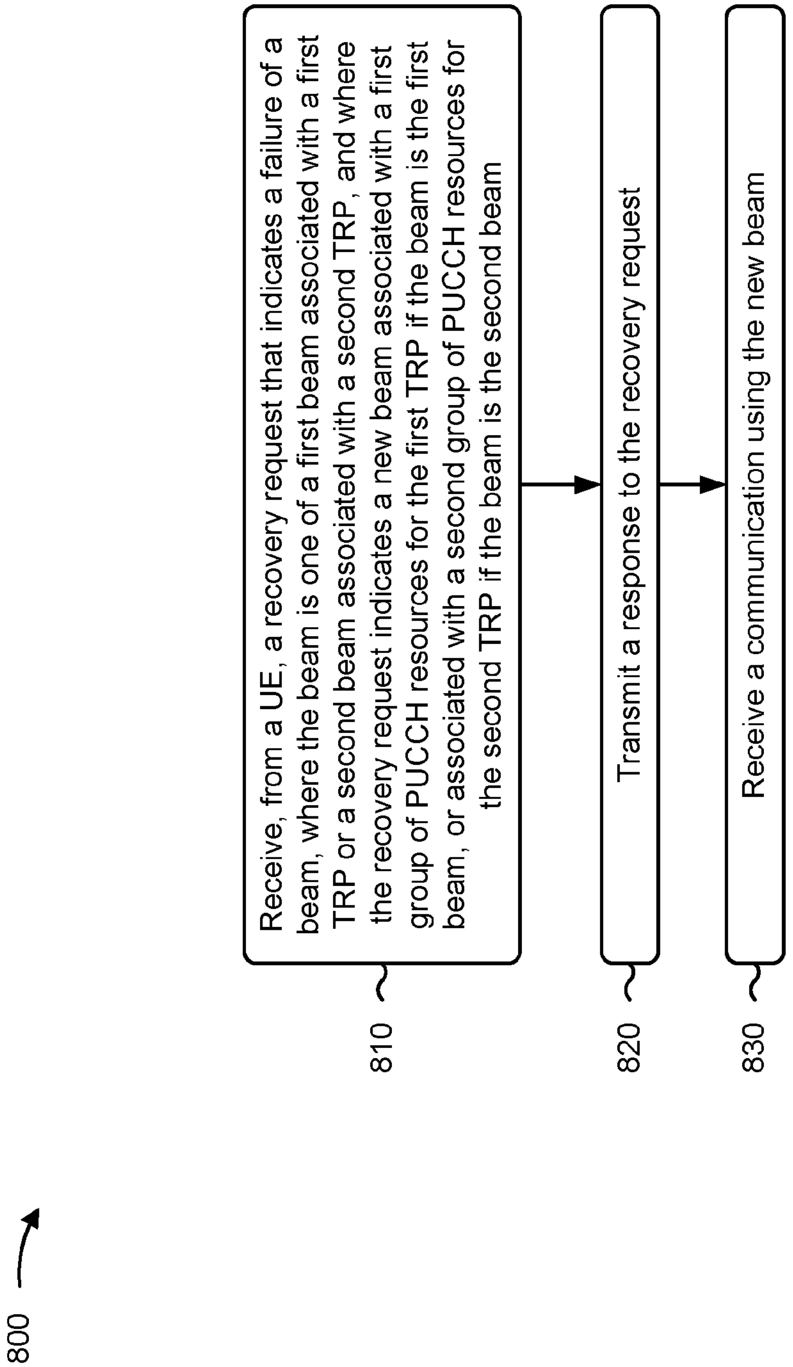
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., base station 110) performs operations associated with BFR for multiple TRPs.

As shown in FIG. 8, in some aspects, process 800 may include receiving, from a UE, a recovery request that indicates a failure of a beam (block 810). For example, the base station (e.g., using communication manager 150 and/or reception component 1202 depicted in FIG. 12) may receive, from a UE, a recovery request that indicates a failure of a beam, as described above. In some aspects, the beam is one of a first beam associated with a first TRP or a second beam associated with a second TRP, and the recovery request indicates a new beam associated with a first group of PUCCH resources for the first TRP if the beam is the first beam, or associated with a second group of PUCCH resources for the second TRP if the beam is the second beam.

As further shown in FIG. 8, in some aspects, process 800 may include transmitting a response to the recovery request (block 820). For example, the base station (e.g., using communication manager 150 and/or transmission component 1204 depicted in FIG. 12) may transmit a response to the recovery request, as described above.

As further shown in FIG. 8, in some aspects, process 800 may include receiving a communication using the new beam (block 830). For example, the base station (e.g., using communication manager 150 and/or reception component 1202 depicted in FIG. 12) may receive a communication using the new beam, as described above.

Process 800 may include additional aspects, such as any single aspect or any combination of aspects described below and/or in connection with one or more other processes described elsewhere herein.

In a first aspect, the first group of PUCCH resources are associated with a first CORESET pool index, a first set of BFD reference signals, and a first set of NBI reference signals, and the second group of PUCCH resources are associated with a second CORESET pool index, a second set of BFD reference signals, and a second set of NBI reference signals.

In a second aspect, alone or in combination with the first aspect, process 800 includes transmitting a message indicating the first CORESET pool index, the first set of BFD reference signals, the first set of NBI reference signals, and the first group of PUCCH resources for the first TRP, the message also indicating the second CORESET pool index, the second set of BFD reference signals, the second set of NBI reference signals, and the second group of PUCCH resources for the second TRP.

In a third aspect, alone or in combination with one or more of the first and second aspects, the first group includes PUCCH resources with a first value of a closed loop index, and the second group includes PUCCH resources with a second value of a closed loop index.

In a fourth aspect, alone or in combination with one or more of the first through third aspects, the first TRP is associated with a first one or more PUCCH groups and the second TRP is associated with a second one or more PUCCH groups, where a sum of the first one or more PUCCH groups and the second one or more PUCCH groups is 4.

In a fifth aspect, alone or in combination with one or more of the first through fourth aspects, at least one of the first PUCCH group and the second PUCCH group is dedicated to BFR.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
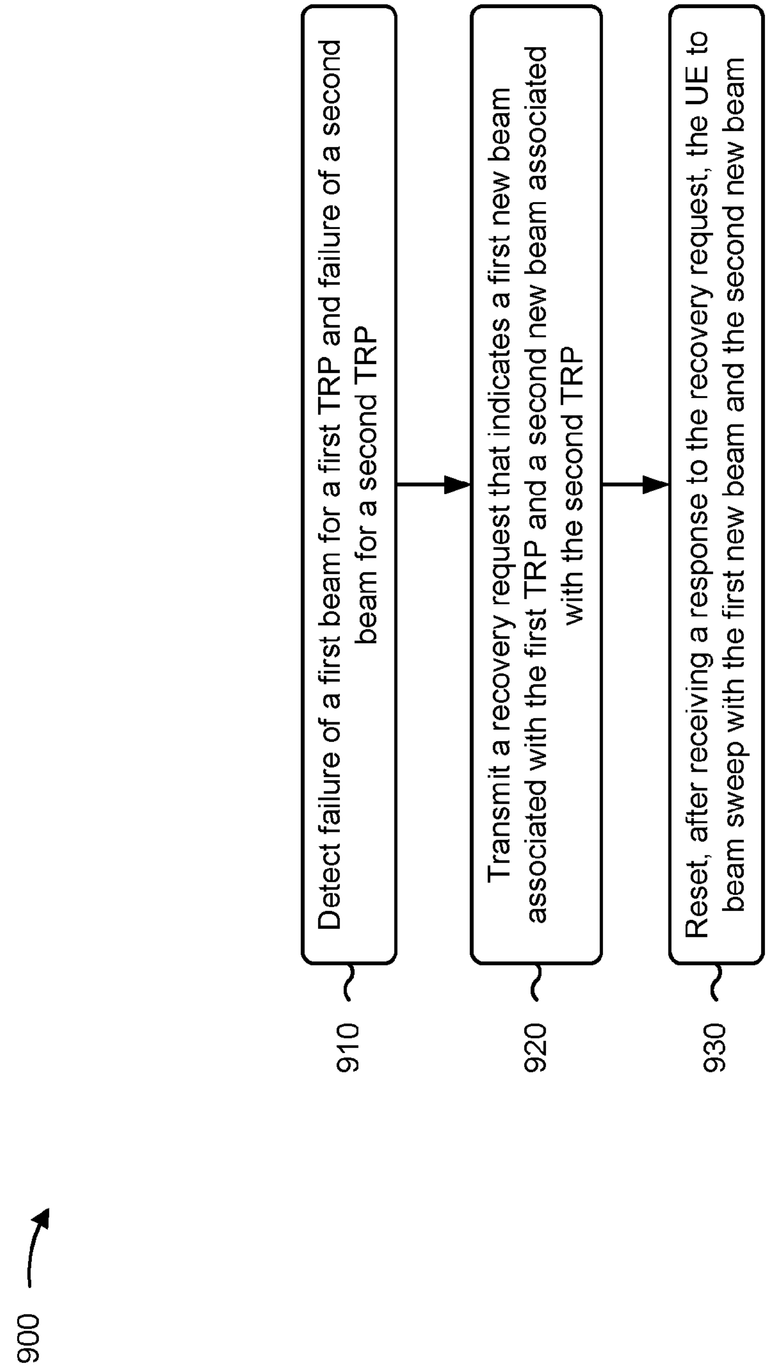
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with BFR for multiple TRPs.

As shown in FIG. 9, in some aspects, process 900 may include detecting failure of a first beam for a first TRP and failure of a second beam for a second TRP (block 910). For example, the UE (e.g., using communication manager 140 and/or detection component 1308 depicted in FIG. 13) may detect failure of a first beam on for a first TRP and failure of a second beam for a second TRP, as described above.

As further shown in FIG. 9, in some aspects, process 900 may include transmitting a recovery request that indicates a first new beam associated with the first TRP and a second new beam associated with the second TRP (block 920). For example, the UE (e.g., using communication manager 140 and/or transmission component 1304 depicted in FIG. 13) may transmit a recovery request that indicates a first new beam associated with the first TRP and a second new beam associated with the second TRP, as described above.

As further shown in FIG. 9, in some aspects, process 900 may include resetting, after receiving a response to the recovery request, the UE to beam sweep with the first new beam and the second new beam (block 930). For example, the UE (e.g., using communication manager 140 and/or reset component 1310 depicted in FIG. 13) may reset, after receiving a response to the recovery request, the UE to beam sweep with the first new beam and the second new beam, as described above.

Process 900 may include additional aspects, such as any single aspect or any combination of aspects described below and/or in connection with one or more other processes described elsewhere herein.

In a first aspect, process 900 includes transmitting PUCCH repetitions using the first new beam and the second new beam in a beam sweep.

In a second aspect, alone or in combination with the first aspect, the PUCCH repetitions are inter-slot PUCCH repetitions.

In a third aspect, alone or in combination with one or more of the first and second aspects, the PUCCH repetitions are intra-slot PUCCH repetitions.

In a fourth aspect, alone or in combination with one or more of the first through third aspects, the first TRP and the second TRP are used for PDCCH communications in an SFN, and a CORESET monitored by the UE has a first TCI state for the first TRP and a second TCI state for the second TRP.

In a fifth aspect, alone or in combination with one or more of the first through fourth aspects, a first CORESET pool index is associated with the first TRP and a second CORESET pool index is associated with the second TRP, where the UE is configured for joint HARQ feedback.

In a sixth aspect, alone or in combination with one or more of the first through fifth aspects, the first TRP and the second TRP are used for PDCCH repetition in two CORESETs with different TCI states.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
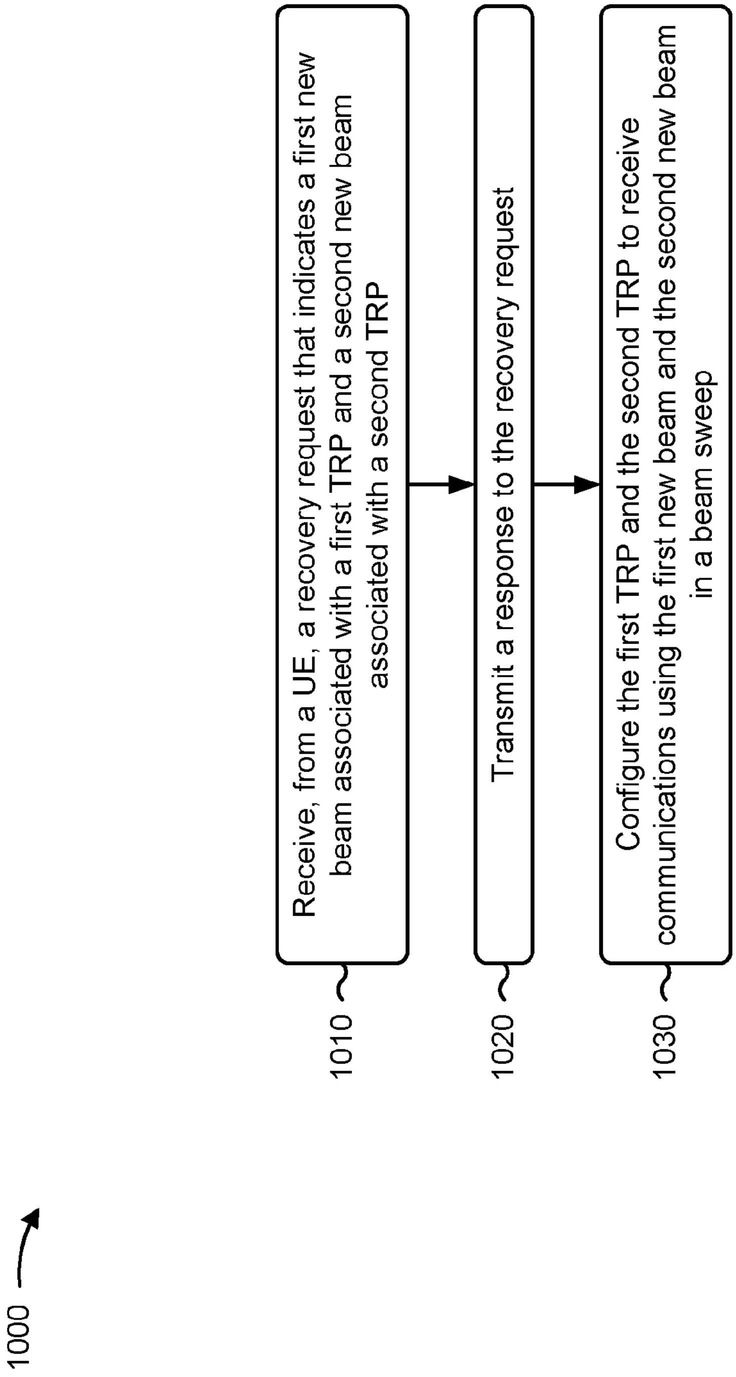
FIG. 10 is a diagram illustrating an example process performed, for example, by a base station, in accordance with the present disclosure.

FIG. 10 is a diagram illustrating an example process 1000 performed, for example, by a base station, in accordance with the present disclosure. Example process 1000 is an example where the base station (e.g., base station 110) performs operations associated with BFR for multiple TRPs.

As shown in FIG. 10, in some aspects, process 1000 may include receiving, from a UE, a recovery request that indicates a first new beam associated with a first TRP and a second new beam associated with a second TRP (block 1010). For example, the base station (e.g., using communication manager 150 and/or reception component 1402 depicted in FIG. 14) may receive, from a UE, a recovery request that indicates a first new beam associated with a first TRP and a second new beam associated with a second TRP, as described above.

As further shown in FIG. 10, in some aspects, process 1000 may include transmitting a response to the recovery request (block 1020). For example, the base station (e.g., using communication manager 150 and/or transmission component 1404 depicted in FIG. 14) may transmit a response to the recovery request, as described above.

As further shown in FIG. 10, in some aspects, process 1000 may include configuring the first TRP and the second TRP to receive communications using the first new beam and the second new beam in a beam sweep (block 1030). For example, the base station (e.g., using communication manager 150 and/or configuration component 1408 depicted in FIG. 14) may configure the first TRP and the second TRP to receive communications using the first new beam and the second new beam in a beam sweep, as described above.

Process 1000 may include additional aspects, such as any single aspect or any combination of aspects described below and/or in connection with one or more other processes described elsewhere herein.

In a first aspect, the beam sweep uses inter-slot PUCCH repetition or intra-slot PUCCH repetition.

In a second aspect, alone or in combination with the first aspect, the first TRP and the second TRP are used for PDCCH communications in an SFN, and a CORESET monitored by the UE has a first TCI state for the first TRP and a second TCI state for the second TRP.

In a third aspect, alone or in combination with one or more of the first and second aspects, a first CORESET pool index is associated with the first TRP and a second CORESET pool index is associated with the second TRP, and process 1000 includes configuring the UE for joint HARQ feedback.

In a fourth aspect, alone or in combination with one or more of the first through third aspects, the first TRP and the second TRP are used for PDCCH repetition in two CORESETs with different TCI states.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
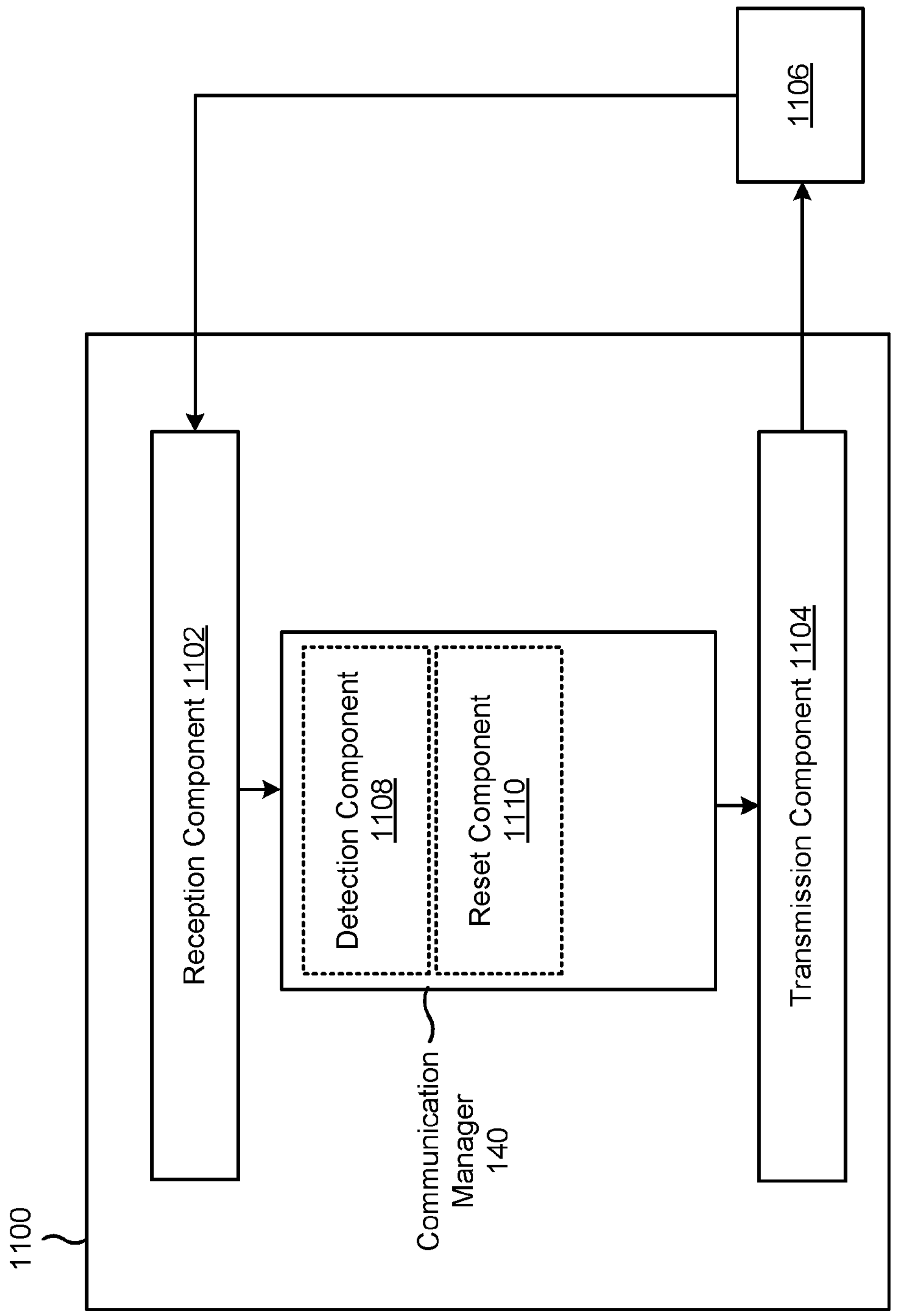
FIGS. 11-14 are diagrams of example apparatuses for wireless communication, in accordance with the present disclosure.

FIG. 11 is a diagram of an example apparatus 1100 for wireless communication. The apparatus 1100 may be a UE (e.g., UE 120), or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a detection component 1108 and/or a reset component 1110, among other examples.

In some aspects, the apparatus 1100 may be configured to perform one or more operations described herein in connection with FIGS. 1-6. Additionally, or alternatively, the apparatus 1100 may be configured to perform one or more processes described herein, such as process 700 of FIG. 7. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The detection component 1108 may detect failure of a beam, where the beam is one of a first beam associated with a first TRP or a second beam associated with a second TRP. The transmission component 1104 may transmit a recovery request that indicates a new beam for a beam reset by the UE, where the new beam is associated with a first group of PUCCH resources for the first TRP if the beam is the first beam, or associated with a second group of PUCCH resources for the second TRP if the beam is the second beam. The reset component 1110 may reset the UE to the new beam after receiving a response to the recovery request.

The reception component 1102 may receive a message indicating the first CORESET pool index, the first set of BFD reference signals, the first set of NBI reference signals, and the first group of PUCCH resources for the first TRP, the message also indicating the second CORESET pool index, the second set of BFD reference signals, the second set of NBI reference signals, and the second group of PUCCH resources for the second TRP.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
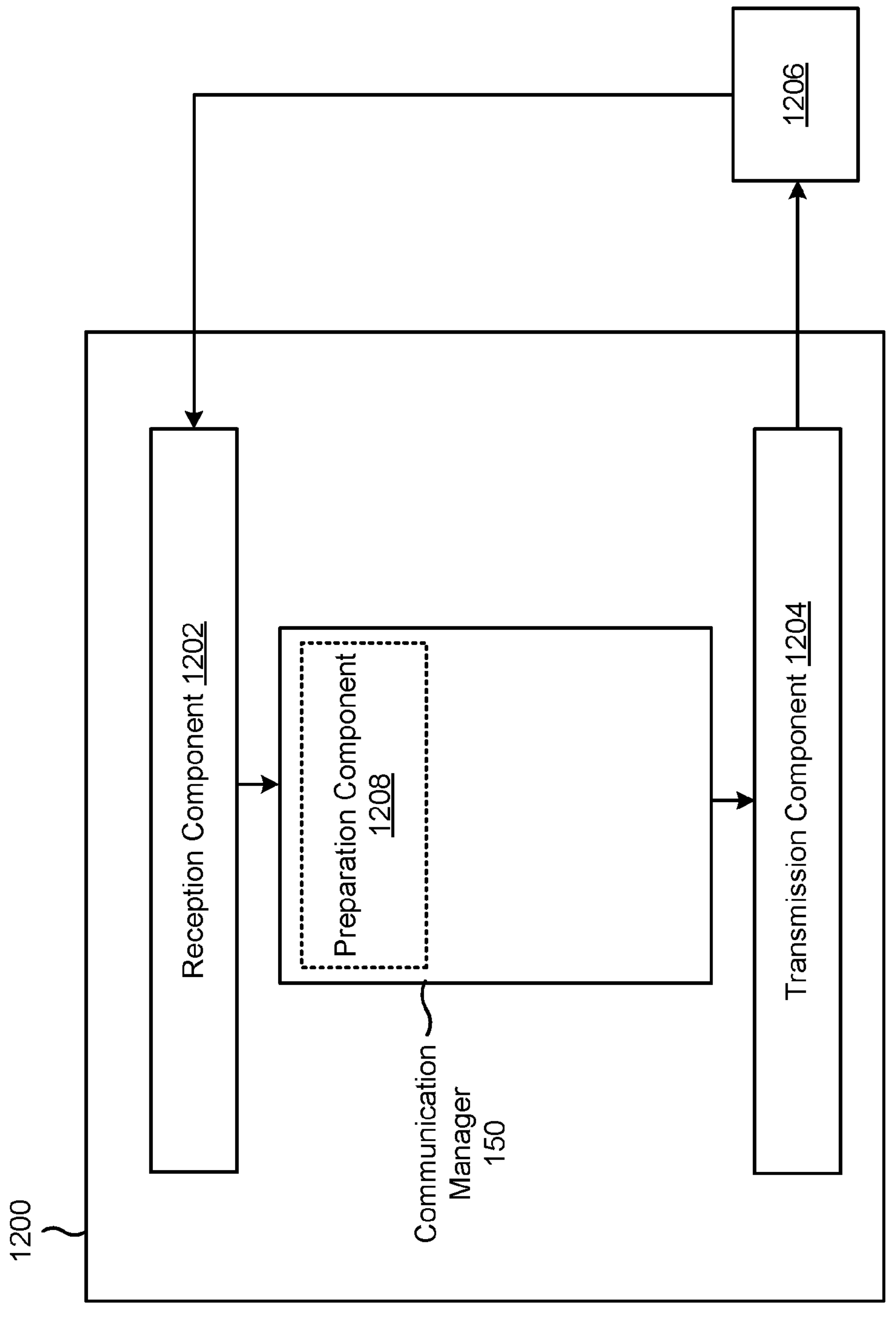

FIG. 12 is a diagram of an example apparatus 1200 for wireless communication. The apparatus 1200 may be a base station (e.g., base station 110), or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include a preparation component 1208, among other examples.

In some aspects, the apparatus 1200 may be configured to perform one or more operations described herein in connection with FIGS. 1-6. Additionally, or alternatively, the apparatus 1200 may be configured to perform one or more processes described herein, such as process 800 of FIG. 8. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a modem, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station described in connection with FIG. 2. In some aspects, the transmission component 1204 may be co-located with the reception component 1202 in a transceiver.

The reception component 1202 may receive, from a UE, a recovery request that indicates a failure of a beam, where the beam is one of a first beam associated with a first TRP or a second beam associated with a second TRP, and where the recovery request indicates a new beam associated with a first group of PUCCH resources for the first TRP if the beam is the first beam, or associated with a second group of PUCCH resources for the second TRP if the beam is the second beam. The transmission component 1204 may transmit a response to the recovery request. The preparation component 1208 may prepare the apparatus 11100 to use the new beam. The reception component 1202 may receive a communication using the new beam.

The transmission component 1204 may transmit a message indicating the first CORESET pool index, the first set of BFD reference signals, the first set of NBI reference signals, and the first group of PUCCH resources for the first TRP, the message also indicating the second CORESET pool index, the second set of BFD reference signals, the second set of NBI reference signals, and the second group of PUCCH resources for the second TRP.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
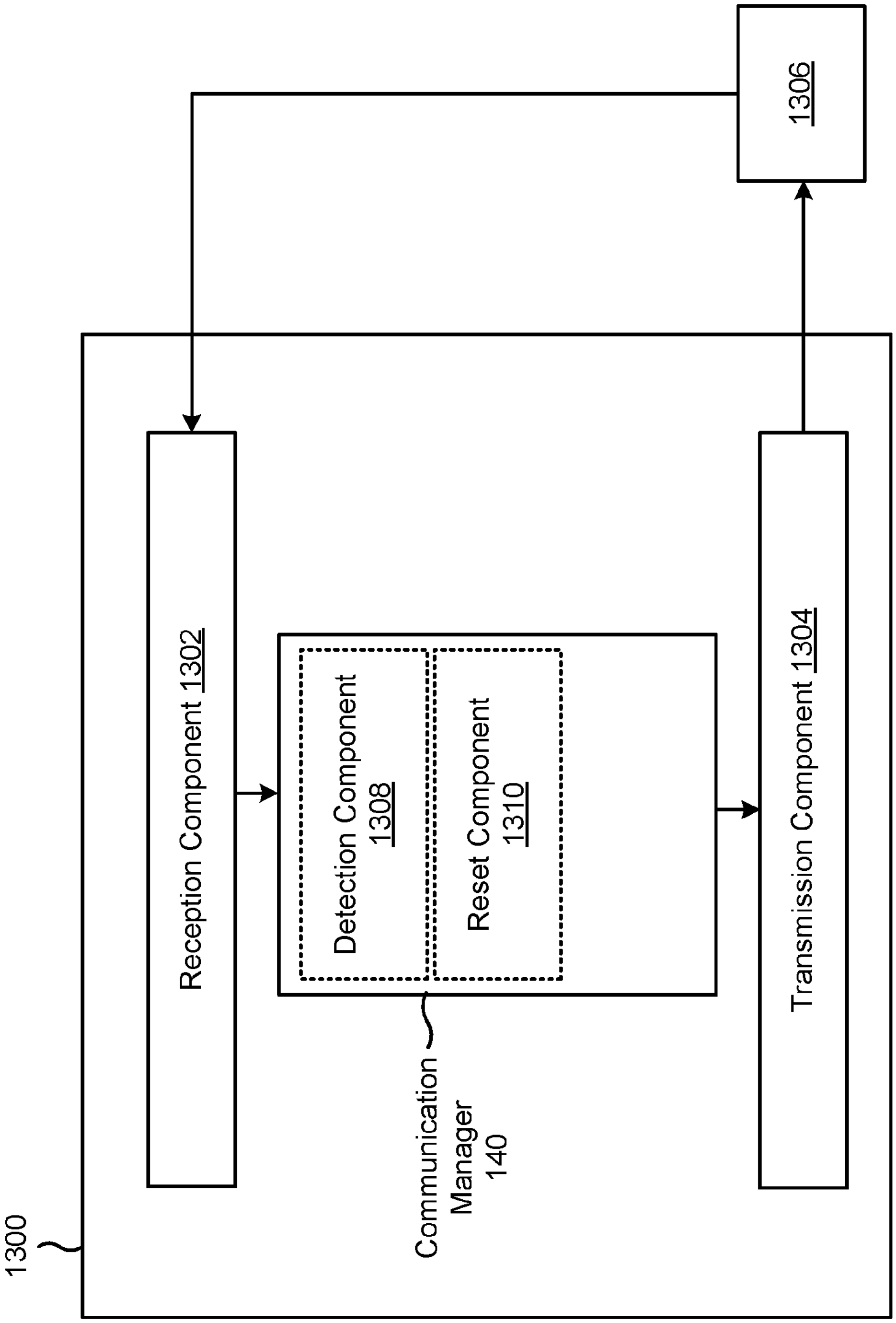

FIG. 13 is a diagram of an example apparatus 1300 for wireless communication. The apparatus 1300 may be a UE (e.g., UE 120), or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include a detection component 1308 and/or a reset component 1310, among other examples.

In some aspects, the apparatus 1300 may be configured to perform one or more operations described herein in connection with FIGS. 1-6. Additionally, or alternatively, the apparatus 1300 may be configured to perform one or more processes described herein, such as process 900 of FIG. 9. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The detection component 1308 may detect failure of a first beam for a first TRP and failure of a second beam for a second TRP. The transmission component 1304 may transmit a recovery request that indicates a first new beam associated with the first TRP and a second new beam associated with the second TRP. The reset component 1310 may reset, after receiving a response to the recovery request, the UE to beam sweep with the first new beam and the second new beam. The transmission component 1304 may transmit PUCCH repetitions using the first new beam and the second new beam in a beam sweep.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
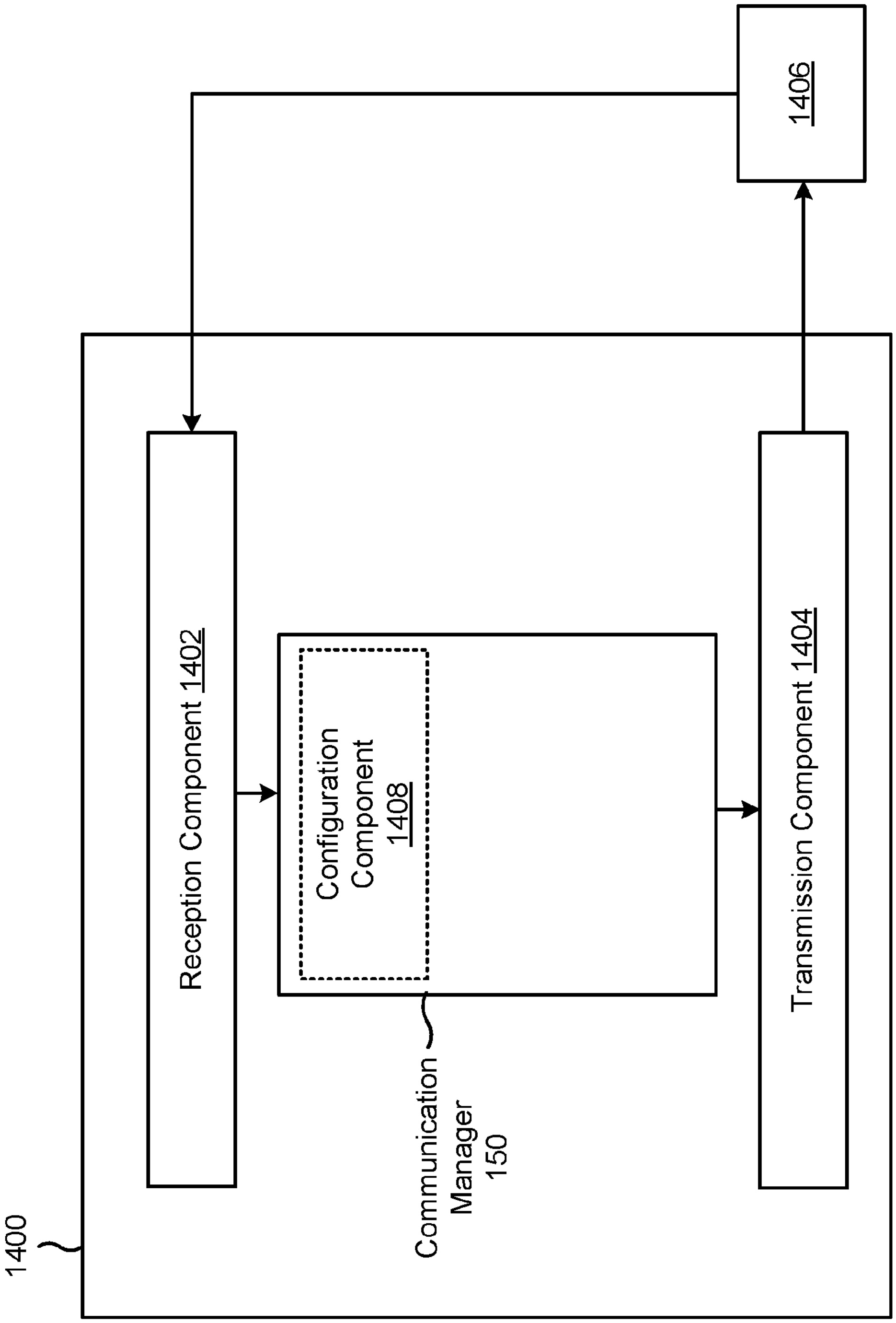

FIG. 14 is a diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 150. The communication manager 150 may include a configuration component 1408, among other examples.

In some aspects, the apparatus 1400 may be configured to perform one or more operations described herein in connection with FIGS. 1-6. Additionally, or alternatively, the apparatus 1400 may be configured to perform one or more processes described herein, such as process 1000 of FIG. 10. In some aspects, the apparatus 1400 and/or one or more components shown in FIG. 14 may include one or more components of the base station described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a modem, a demodulator, a MIMO detector, a receive processor, a controller/processor, a memory, or a combination thereof, of the base station described in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the base station described in connection with FIG. 2. In some aspects, the transmission component 1404 may be co-located with the reception component 1402 in a transceiver.

The reception component 1402 may receive, from a UE, a recovery request that indicates a first new beam associated with a first TRP and a second new beam associated with a second TRP. The transmission component 1404 may transmit a response to the recovery request. The configuration component 1408 may configure the first TRP and the second TRP to receive communications using the first new beam and the second new beam in a beam sweep.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: detecting failure of a beam, wherein the beam is one of a first beam associated with a first transmit receive point (TRP) or a second beam associated with a second TRP; transmitting a recovery request that indicates a new beam for a beam reset by the UE, wherein the new beam is associated with a first group of physical uplink control channel (PUCCH) resources for the first TRP if the beam is the first beam, or associated with a second group of PUCCH resources for the second TRP if the beam is the second beam; and resetting the UE to the new beam after receiving a response to the recovery request.

Aspect 2: The method of Aspect 1, wherein the first group of PUCCH resources are associated with a first control resource set (CORESET) pool index, a first set of beam failure detection (BFD) reference signals, and a first set of new beam identifier (NBI) reference signals, and wherein the second group of PUCCH resources are associated with a second CORESET pool index, a second set of BFD reference signals, and a second set of NBI reference signals.

Aspect 3: The method of Aspect 2, further comprising receiving a message indicating the first CORESET pool index, the first set of BFD reference signals, the first set of NBI reference signals, and the first group of PUCCH resources for the first TRP, the message also indicating the second CORESET pool index, the second set of BFD reference signals, the second set of NBI reference signals, and the second group of PUCCH resources for the second TRP.

Aspect 4: The method of any of Aspects 1-3, wherein resetting the UE to the new beam includes configuring the UE, a quantity of symbols after receiving the response, with a spatial filter that corresponds to the new beam.

Aspect 5: The method of Aspect 4, wherein the quantity of symbols is 28 symbols.

Aspect 6: The method of Aspect 4 or 5, wherein the UE is configured with the spatial filter until the UE receives an activation command to change beams for a PUCCH resource in the first group if the beam is the first beam, or receives an activation command to change beams for a PUCCH resource in the second group if the beam is the second beam.

Aspect 7: The method of any of Aspects 4-6, wherein the UE is configured with the spatial filter until the UE receives an activation command to change beams for a PUCCH resource in the first group or the second group.

Aspect 8: The method of any of Aspects 1-7, wherein the first group includes PUCCH resources with a first value of a closed loop index, and the second group includes PUCCH resources with a second value of a closed loop index.

Aspect 9: The method of any of Aspects 1-8, wherein the first group or the second group includes PUCCH resources of a stored radio resource control configuration.

Aspect 10: The method of any of Aspects 1-9, wherein the first TRP is associated with a first one or more PUCCH groups and the second TRP is associated with a second one or more PUCCH groups, wherein a total quantity of PUCCH groups of the first one or more PUCCH groups and the second one or more PUCCH groups is 4.

Aspect 11: The method of any of Aspects 1-10, wherein at least one of the first PUCCH group or the second PUCCH group is dedicated to beam failure recovery.

Aspect 12: A method of wireless communication performed by a base station, comprising: receiving, from a user equipment (UE), a recovery request that indicates a failure of a beam, wherein the beam is one of a first beam associated with a first transmit receive point (TRP) or a second beam associated with a second TRP, and wherein the recovery request indicates a new beam associated with a first group of PUCCH resources for the first TRP if the beam is the first beam, or associated with a second group of PUCCH resources for the second TRP if the beam is the second beam; transmitting a response to the recovery request; and receiving a communication using the new beam.

Aspect 13: The method of Aspect 12, wherein the first group of PUCCH resources are associated with a first control resource set (CORESET) pool index, a first set of beam failure detection (BFD) reference signals, and a first set of new beam identifier (NBI) reference signals, and wherein the second group of PUCCH resources are associated with a second CORESET pool index, a second set of BFD reference signals, and a second set of NBI reference signals.

Aspect 14: The method of Aspect 13, further comprising transmitting a message indicating the first CORESET pool index, the first set of BFD reference signals, the first set of NBI reference signals, and the first group of PUCCH resources for the first TRP, the message also indicating the second CORESET pool index, the second set of BFD reference signals, the second set of NBI reference signals, and the second group of PUCCH resources for the second TRP.

Aspect 15: The method of Aspect 13 or 14, wherein the first group includes PUCCH resources with a first value of a closed loop index, and the second group includes PUCCH resources with a second value of a closed loop index.

Aspect 16: The method of any of Aspects 13-15, wherein the first TRP is associated with a first one or more PUCCH groups and the second TRP is associated with a second one or more PUCCH groups, wherein a sum of the first one or more PUCCH groups and the second one or more PUCCH groups is 4.

Aspect 17: The method of any of Aspects 13-16, wherein at least one of the first PUCCH group and the second PUCCH group is dedicated to beam failure recovery.

Aspect 18: A method of wireless communication performed by a user equipment (UE), comprising: detecting failure of a first beam for a first transmit receive point (TRP) and failure of a second beam for a second TRP; transmitting a recovery request that indicates a first new beam associated with the first TRP and a second new beam associated with the second TRP; and resetting, after receiving a response to the recovery request, the UE to beam sweep with the first new beam and the second new beam.

Aspect 19: The method of Aspect 18, further comprising transmitting physical uplink control channel (PUCCH) repetitions using the first new beam and the second new beam in a beam sweep.

Aspect 20: The method of Aspect 19, wherein the PUCCH repetitions are inter-slot PUCCH repetitions.

Aspect 21: The method of Aspect 19, wherein the PUCCH repetitions are intra-slot PUCCH repetitions.

Aspect 22: The method of any of Aspects 19-21, wherein the first TRP and the second TRP are used for physical downlink control channel communications in a single frequency network, and wherein a control resource set monitored by the UE has a first transmission control indicator (TCI) state for the first TRP and a second TCI state for the second TRP.

Aspect 23: The method of any of Aspects 19-21, wherein a first control resource set (CORESET) pool index is associated with the first TRP and a second CORESET pool index is associated with the second TRP, wherein the UE is configured for joint hybrid automatic repeat request feedback.

Aspect 24: The method of any of Aspects 19-21, wherein the first TRP and the second TRP are used for physical downlink control channel repetition in two control resource sets with different transmission control indicator states.

Aspect 25: A method of wireless communication performed by a base station, comprising: receiving, from a user equipment (UE), a recovery request that indicates a first new beam associated with a first transmit receive point (TRP) and a second new beam associated with a second TRP; transmitting a response to the recovery request; and configuring the first TRP and the second TRP to receive communications using the first new beam and the second new beam in a beam sweep.

Aspect 26: The method of Aspect 25, wherein the beam sweep uses inter-slot physical uplink control channel (PUCCH) repetition or intra-slot PUCCH repetition.

Aspect 27: The method of Aspect 26, wherein the first TRP and the second TRP are used for physical downlink control channel communications in a single frequency network, and wherein a control resource set monitored by the UE has a first transmission control indicator (TCI) state for the first TRP and a second TCI state for the second TRP.

Aspect 28: The method of Aspect 26, wherein a first control resource set (CORESET) pool index is associated with the first TRP and a second CORESET pool index is associated with the second TRP, wherein the method further comprises configuring the UE for joint hybrid automatic repeat request feedback.

Aspect 29: The method of Aspect 26, wherein the first TRP and the second TRP are used for physical downlink control channel repetition in two control resource sets with different transmission control indicator states.

Aspect 30: An apparatus for wireless communication at a device, comprising a processor; memory coupled with the processor; and instructions stored in the memory and executable by the processor to cause the apparatus to perform the method of one or more of Aspects 1-29.

Aspect 31: A device for wireless communication, comprising a memory and one or more processors coupled to the memory, the one or more processors configured to perform the method of one or more of Aspects 1-29.

Aspect 32: An apparatus for wireless communication, comprising at least one means for performing the method of one or more of Aspects 1-29.

Aspect 33: A non-transitory computer-readable medium storing code for wireless communication, the code comprising instructions executable by a processor to perform the method of one or more of Aspects 1-29.

Aspect 34: A non-transitory computer-readable medium storing a set of instructions for wireless communication, the set of instructions comprising one or more instructions that, when executed by one or more processors of a device, cause the device to perform the method of one or more of Aspects 1-29.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors, coupled to the one or more memories, configured to:

detect failure of a beam, wherein the beam is one of a first beam associated with a first transmit receive point (TRP) or a second beam associated with a second TRP;

transmit a recovery request that indicates a new beam for a beam reset by the UE, wherein the new beam is associated with a first physical uplink control channel (PUCCH) group for the first TRP if the beam is the first beam, or associated with a second PUCCH group for the second TRP if the beam is the second beam, and wherein the first PUCCH group is associated with a first control resource set (CORESET) pool index, a first set of beam failure detection (BFD) reference signals, and a first set of new beam identifier (NBI) reference signals, and wherein the second PUCCH group is associated with a second CORESET pool index, a second set of BFD reference signals, and a second set of NBI reference signals; and reset the UE to the new beam after receiving a response to the recovery request.

2. The UE of claim 1, wherein the one or more processors are configured to receive a message indicating the first CORESET pool index, the first set of BFD reference signals, the first set of NBI reference signals, and the first PUCCH group for the first TRP, the message also indicating the second CORESET pool index, the second set of BFD reference signals, the second set of NBI reference signals, and the second PUCCH group for the second TRP.

3. The UE of claim 1, wherein the one or more processors, to reset the UE to the new beam, are configured to configure the UE, a quantity of symbols after receiving the response, with a spatial filter that corresponds to the new beam.

4. The UE of claim 3, wherein the quantity of symbols is 28 symbols.

5. The UE of claim 3, wherein the UE is configured with the spatial filter until the UE receives an activation command to change beams for a PUCCH resource in the first group if the beam is the first beam, or receives an activation command to change beams for a PUCCH resource in the second group if the beam is the second beam.

6. The UE of claim 3, wherein the UE is configured with the spatial filter until the UE receives an activation command to change beams for a PUCCH resource in the first group or the second group.

7. The UE of claim 1, wherein the first group includes PUCCH resources with a first value of a closed loop index, and the second group includes PUCCH resources with a second value of a closed loop index.

8. The UE of claim 1, wherein the first group or the second group includes PUCCH resources of a stored radio resource control configuration.

9. The UE of claim 1, wherein the first TRP is associated with a first one or more PUCCH groups and the second TRP is associated with a second one or more PUCCH groups, wherein a total quantity of PUCCH groups of the first one or more PUCCH groups and the second one or more PUCCH groups is 4.

10. The UE of claim 1, wherein at least one of the first PUCCH group or the second PUCCH group is dedicated to beam failure recovery.

11. A base station for wireless communication, comprising:

one or more memories; and one or more processors, coupled to the one or more memories, configured to:

receive, from a user equipment (UE), a recovery request that indicates a failure of a beam, wherein the beam is one of a first beam associated with a first transmit receive point (TRP) or a second beam associated with a second TRP, and wherein the recovery request indicates a new beam associated with a first physical uplink control channel (PUCCH) group for the first TRP if the beam is the first beam, or associated with a second PUCCH group for the second TRP if the beam is the second beam, and wherein the first PUCCH group is associated with a first control resource set (CORESET) pool index, a first set of beam failure detection (BFD) reference signals, and a first set of new beam identifier (NBI) reference signals, and wherein the second PUCCH group is associated with a second CORESET pool index, a second set of BFD reference signals, and a second set of NBI reference signals;

transmit a response to the recovery request; and receive a communication using the new beam.

12. The base station of claim 11, wherein the one or more processors are configured to transmit a message indicating the first CORESET pool index, the first set of BFD reference signals, the first set of NBI reference signals, and the first PUCCH group for the first TRP, the message also indicating the second CORESET pool index, the second set of BFD reference signals, the second set of NBI reference signals, and the second PUCCH group for the second TRP.

13. The base station of claim 11, wherein the first group includes PUCCH resources with a first value of a closed loop index, and the second group includes PUCCH resources with a second value of a closed loop index.

14. The base station of claim 11, wherein the first TRP is associated with a first one or more PUCCH groups and the second TRP is associated with a second one or more PUCCH groups, wherein a sum of the first one or more PUCCH groups and the second one or more PUCCH groups is 4.

15. The base station of claim 11, wherein at least one of the first PUCCH group and the second PUCCH group is dedicated to beam failure recovery.

16. A user equipment (UE) for wireless communication, comprising:

one or more memories; and one or more processors, coupled to the one or more memories, configured to:

detect failure of a first beam for a first transmit receive point (TRP) and failure of a second beam for a second TRP;

transmit a recovery request that indicates a first new beam associated with the first TRP and a second new beam associated with the second TRP, the first new beam associated with a first physical uplink control channel (PUCCH) group for the first TRP and the second new beam associated with a second PUCCH group for the second TRP, wherein the first PUCCH group is associated with a first control resource set (CORESET) pool index, a first set of beam failure detection (BFD) reference signals, and a first set of new beam identifier (NBI) reference signals, and wherein the second PUCCH group is associated with a second CORESET pool index, a second set of BFD reference signals, and a second set of NBI reference signals; and reset, after receiving a response to the recovery request, the UE to beam sweep with the first new beam and the second new beam.

17. The UE of claim 16, wherein the one or more processors are configured to transmit PUCCH repetitions using the first new beam and the second new beam in a beam sweep.

18. The UE of claim 17, wherein the PUCCH repetitions are inter-slot PUCCH repetitions.

19. The UE of claim 17, wherein the PUCCH repetitions are intra-slot PUCCH repetitions.

20. The UE of claim 17, wherein the first TRP and the second TRP are used for physical downlink control channel communications in a single frequency network, and wherein a control resource set monitored by the UE has a first transmission control indicator (TCI) state for the first TRP and a second TCI state for the second TRP.

21. The UE of claim 17, wherein the first CORESET pool index is associated with the first TRP and the second CORESET pool index is associated with the second TRP, wherein the UE is configured for joint hybrid automatic repeat request feedback.

22. The UE of claim 17, wherein the first TRP and the second TRP are used for physical downlink control channel repetition in two control resource sets with different transmission control indicator states.

23. A base station for wireless communication, comprising:

one or more memories; and one or more processors, coupled to the one or more memories, configured to:

receive, from a user equipment (UE), a recovery request that indicates a first new beam associated with a first transmit receive point (TRP) and a second new beam associated with a second TRP, the first new beam associated with a first physical uplink control channel (PUCCH) group for the first TRP and the second new beam associated with a second PUCCH group for the second TRP, wherein the first PUCCH group is associated with a first control resource set (CORESET) pool index, a first set of beam failure detection (BFD) reference signals, and a first set of new beam identifier (NBI) reference signals, and wherein the second PUCCH group is associated with a second CORESET pool index, a second set of BFD reference signals, and a second set of NBI reference signals;

transmit a response to the recovery request; and configure the first TRP and the second TRP to receive communications using the first new beam and the second new beam in a beam sweep.

24. The base station of claim 23, wherein the beam sweep uses inter-slot PUCCH repetition or intra-slot PUCCH repetition.

25. The base station of claim 24, wherein the first TRP and the second TRP are used for physical downlink control channel communications in a single frequency network, and wherein a control resource set monitored by the UE has a first transmission control indicator (TCI) state for the first TRP and a second TCI state for the second TRP.

26. The base station of claim 24, wherein the first CORESET pool index is associated with the first TRP and the second CORESET pool index is associated with the second TRP, wherein the one or more processors are configured to configure the UE for joint hybrid automatic repeat request feedback.

27. The base station of claim 24, wherein the first TRP and the second TRP are used for physical downlink control channel repetition in two control resource sets with different transmission control indicator states.

28. The UE of claim 17, wherein the one or more processors are configured to receive a message indicating the first CORESET pool index, the first set of BFD reference signals, the first set of NBI reference signals, and the first PUCCH group for the first TRP, the message also indicating the second CORESET pool index, the second set of BFD reference signals, the second set of NBI reference signals, and the second PUCCH group for the second TRP.

29. The base station of claim 24, wherein the one or more processors are configured to transmit a message indicating the first CORESET pool index, the first set of BFD reference signals, the first set of NBI reference signals, and the first PUCCH group for the first TRP, the message also indicating the second CORESET pool index, the second set of BFD reference signals, the second set of NBI reference signals, and the second PUCCH group for the second TRP.

* * * * *